US012567336B2

(12) United States Patent
Park et al.

(10) Patent No.: US 12,567,336 B2
(45) Date of Patent: Mar. 3, 2026

(54) METHOD, APPARATUS AND COMPUTER PROGRAM TO DETECT DANGEROUS OBJECT FOR AERIAL VEHICLE

(71) Applicant: THINKWARE CORPORATION, Seongnam-si (KR)

(72) Inventors: Yo Sep Park, Seongnam-si (KR); Suk Pil Ko, Seongnam-si (KR); Shin Hyoung Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 371 days.

(21) Appl. No.: 18/107,750

(22) Filed: Feb. 9, 2023

(65) Prior Publication Data

US 2023/0343230 A1     Oct. 26, 2023

(30) Foreign Application Priority Data

Feb. 9, 2022   (KR) ........................ 10-2022-0017105
Feb. 9, 2023   (KR) ........................ 10-2023-0017647

(51) Int. Cl.
| | |
|---|---|
| *G05D 1/00* | (2024.01) |
| *G01S 13/86* | (2006.01) |
| *G01S 17/86* | (2020.01) |
| *G05D 1/242* | (2024.01) |
| *G05D 1/243* | (2024.01) |

(Continued)

(52) U.S. Cl.
CPC ............ *G08G 5/727* (2025.01); *G01S 13/865* (2013.01); *G01S 13/867* (2013.01); *G01S 17/86* (2020.01); *G05D 1/1064* (2019.05); *G05D 1/242* (2024.01); *G05D 1/243*

(2024.01); *G05D 1/2464* (2024.01); *G05D 1/622* (2024.01); *G06T 7/70* (2017.01); *G08G 5/22* (2025.01); *G08G 5/55* (2025.01); *G08G 5/57* (2025.01); *G08G 5/80* (2025.01); *G05D 2107/13* (2024.01);

(Continued)

(58) Field of Classification Search
CPC   G08G 5/727; G08G 5/22; G08G 5/55; G08G 5/57; G08G 5/80; G08G 5/21; G01S 13/865; G01S 13/867; G01S 17/86; G01S 13/933; G01S 17/933; G05D 1/1064; G05D 1/242; G05D 1/243; G05D 1/2464; G05D 1/622; G05D 2107/13; G05D 2111/10; G05D 2111/30; G05D 2105/24; G05D 2109/254; G05D 2111/17; G06T 7/70; G06T 7/11; G06T 2207/10028; G06T 5/50; G06T 7/55; G06T 2210/12; G06V 20/17; G06V 20/58
See application file for complete search history.

(56) References Cited

U.S. PATENT DOCUMENTS 10,109,059 B1 * 10/2018 Klein ...................... G01S 17/89
11,719,541 B2 * 8/2023 Langland ........... G01N 33/0062
                                                        702/5

(Continued)

*Primary Examiner* — Sohana Tanju Khayer
(74) *Attorney, Agent, or Firm* — WHDA, LLP

(57)     ABSTRACT

Disclosed is a method of detecting a dangerous object for an aerial vehicle. The method includes setting an object detection area in air in which the aerial vehicle is in flight using a first sensor, a second sensor, and a third sensor; detecting an object in the set object detection area; generating detailed object information on the detected object; and determining whether the detected object is the dangerous object based on the generated detailed object information.

19 Claims, 19 Drawing Sheets

(51) Int. Cl.

| | |
|---|---|
| *G05D 1/246* | (2024.01) |
| *G05D 1/622* | (2024.01) |
| *G06T 7/11* | (2017.01) |
| *G06T 7/70* | (2017.01) |
| *G08G 5/22* | (2025.01) |
| *G08G 5/55* | (2025.01) |
| *G08G 5/57* | (2025.01) |
| *G08G 5/72* | (2025.01) |
| *G08G 5/80* | (2025.01) |
| G05D 107/13 | (2024.01) |
| G05D 111/10 | (2024.01) |
| G05D 111/30 | (2024.01) |

(52) U.S. Cl.

CPC ...... *G05D 2111/10* (2024.01); *G05D 2111/30* (2024.01); *G06T 7/11* (2017.01); *G06T 2207/10028* (2013.01)

(56) References Cited

U.S. PATENT DOCUMENTS

| 2007/0052806 A1* | 3/2007 | Bnayahu ................. F41H 11/02 |
| | | 701/519 |
| 2009/0149990 A1* | 6/2009 | Myeong ............... G05D 1/0274 |
| | | 701/25 |
| 2012/0200600 A1* | 8/2012 | Demaine ............. G06F 3/04883 |
| | | 345/633 |
| 2016/0140851 A1* | 5/2016 | Levy ........................ G08G 5/34 |
| | | 701/410 |
| 2017/0263132 A1* | 9/2017 | Butler ..................... G08G 5/76 |
| 2018/0131449 A1* | 5/2018 | Kare ....................... H02J 50/10 |
| 2019/0297257 A1* | 9/2019 | Ishibashi ............... H04N 23/90 |
| 2019/0311636 A1* | 10/2019 | Fanelli .................... G08G 5/32 |
| 2019/0349571 A1* | 11/2019 | Herman ............... H04N 23/698 |
| 2020/0334996 A1* | 10/2020 | Estkowski ............... G08G 5/34 |
| 2020/0348183 A1* | 11/2020 | Agarwal .................. G01J 5/12 |
| 2021/0018609 A1* | 1/2021 | Zhu ........................ G01S 13/42 |
| 2021/0063200 A1* | 3/2021 | Kroepfl ................. G01S 13/931 |
| 2021/0097873 A1* | 4/2021 | Sassinsky ............... G08G 5/53 |
| 2021/0287037 A1* | 9/2021 | Chen ..................... G06V 10/454 |
| 2021/0358310 A1* | 11/2021 | Sachs ....................... G08G 5/22 |
| 2022/0042694 A1* | 2/2022 | He .......................... F24F 11/30 |
| 2022/0223056 A1* | 7/2022 | Dupray ................... G08G 5/21 |
| 2022/0327937 A1* | 10/2022 | Ayhan ..................... G08G 5/55 |
| 2023/0018515 A1* | 1/2023 | Nakahara .............. G06V 20/64 |
| 2023/0186642 A1* | 6/2023 | Chang .................. G01S 17/931 |
| | | 382/181 |
| 2023/0245318 A1* | 8/2023 | Sakata ................... G06T 7/136 |
| | | 382/103 |
| 2024/0290108 A1* | 8/2024 | Komatsu ............. G01S 13/931 |

* cited by examiner

FIG. 19

METHOD, APPARATUS AND COMPUTER PROGRAM TO DETECT DANGEROUS OBJECT FOR AERIAL VEHICLE

BACKGROUND

1. Field

The technical idea of the present disclosure relates to a method, apparatus, and computer program for detecting a dangerous object for an aerial vehicle, and a computer-readable recording medium including program code for executing the method of detecting a dangerous object for an aerial vehicle.

2. Description of Related Art

Urban air mobility (UAM) may be a next-generation mobility solution that maximizes mobility efficiency in the urban area, and has emerged to solve the rapid increase in social costs or the like such as reduced movement efficiency and logistics transportation costs due to congested traffic jam in the urban area.

In modern times where long-distance travel time has increased and traffic jam has worsened, the UAM solving these problems is considered a future innovation business.

The operation of the initial UAM used a new airframe type certified for flight in the current operating regulations and environment. For the introduction of the UAM operations, innovations in related regulations and UAM dedicated flight corridors may be introduced. New operating regulations and infrastructure enable highly autonomous traffic management.

Due to the increase in ground traffic every year, the time required for travel becomes longer, resulting in considerable economic cost loss. As a concept of city-centered air transportation that has been continuously discussed for this purpose, the limitations of the existing helicopter-type transportation have not been resolved, and as a result, high costs of operation and customer service and negative public perceptions of noise and pollution have hampered significant market growth.

This has led to the search for alternative transportation means, and the evolution of modern technology has made it possible to support the development of the concept of the UAM. In this sense, the introduction of the concept of the UAM suggests a new approach to alternative air transportation means in the urban area.

The UAM aerial vehicle is generally transportation means that constructs a next-generation advanced transportation system that safely and conveniently transports people and cargo in the urban environment based on electric power, low-noise aircraft, and a vertical take-off and landing pad. The reason why the above-described low noise and vertical take-off and landing should be premised is to increase the movement efficiency when operated in the urban area.

Due to the activation and commercialization of such unmanned aerial vehicle, the demand for effective control and management of the unmanned aerial vehicle is increasing. To this end, it is necessary to visualize a flight route of the unmanned aerial vehicle in order to allow the unmanned aerial vehicle to fly or to effectively manage the route of the unmanned aerial vehicles in flight.

In general, the currently commercialized aerial vehicle provides a route guidance service to a pilot by a method of providing the flight route and operational information through a multi-function display installed in the aerial vehicle, but since this conventional method simply displays route information between a departure point and a destination numerically or in a radar form, the conventional method has a problem in that only experienced pilots may acquire the information and the pilots may not confirm in real time the presence or absence of hazards for the external environment in relation to the aircraft operation.

In addition, while the UAM aerial vehicle flying in the urban environment having a low flight altitude is frequently exposed to dangerous objects (electric wires, birds, buildings, etc.), the pilot may only confirm a front view, so it is difficult to detect dangerous objects located on or approaching a rear surface, a side surface, or the like of the unmanned aerial vehicle.

Therefore, for the commercialization and stable flight of the UAM aerial vehicle, it is necessary to visualize a flight route on a 3D map for an intuitive and effective visualization of the flight route, and it is necessary to visualize various factors, such as whether flight is permitted, route setting, detection of ground buildings, and detection of dangerous objects, along with the flight route.

In addition, for commercialization and stable flight of the UAM aerial vehicle, technology of detecting and avoiding various hazards that may occur during the flight of the UAM aerial vehicle is required.

SUMMARY

Accordingly, an object of the present disclosure is to solve the above problems.

The present disclosure is to provide technology of fusing sensing data of each of the radar, Lidar, and camera to detect and recognize various hazards (e.g., other aerial vehicles, bird flocks, buildings, etc.) that may be dangerous during flight of UAM aerial vehicle.

The present disclosure is to provide a fusion technology of sensor data according to a distance between aerial vehicle and an object by distinguishing detection distances for each sensor to set a main sensor for long-distance detection to radar, and set a main sensor for mid-range detection to LiDAR, and set a main sensor for short-range detection to a camera.

The present disclosure is to provide a proposal for detection of flight threat factors encountered during operation of UAM aerial vehicle, a warning user interface, and update of detected sudden threat factors.

In an aspect of the present disclosure, a method of detecting a dangerous object for an aerial vehicle includes: setting an object detection area in air in which the aerial vehicle is in flight using a first sensor, a second sensor, and a third sensor; detecting an object in the set object detection area; generating detailed object information on the detected object; and determining whether the detected object is the dangerous object based on the generated detailed object information.

The object detection area in the air may include a first area formed by the first sensor, a second area formed by the second sensor, and a third area formed by the third sensor.

The first area may be an area having a greater coverage than the second area and the third area, and the second area may be an area having a greater coverage than the third area.

The first sensor may be a radar, the second sensor may be a Lidar, and the third sensor may be a camera.

The method may further include: acquiring first sensing data, second sensing data, and third sensing data detected by each of the first sensor, the second sensor, and the third sensor, in which the first sensing data may include 2-dimensional (2D) point cloud data, the second sensing data includes 3-dimensional (3D) point cloud data, and the third sensing data may include an image.

The generating of the detailed object information on the object located between the first area and the second area may include generating a first voxel map using point cloud data included in the first sensor data.

The generating of the detailed object information on the object located between the second area and the third area may include: generating a first voxel map using point cloud data included in the first sensor data; generating a second voxel map using point cloud data included in the second sensor data; and generating a depth map by fusing the first voxel map and the second voxel map.

The generating of the detailed object information on the object located in the third area may include: generating a first voxel map using point cloud data included in the first sensor data; generating a second voxel map using point cloud data included in the second sensor data; generating a depth map by fusing the first voxel map and the second voxel map; generating an object detection image including a bounding box indicating a an area of an object in the image and information on a type of object corresponding to the bounding box by analyzing an image included in the third sensor data; and generating a final voxel map by fusing the depth map and the object detection image.

The detailed object information may include at least one of coordinate position, kinematic information, geometric information, and semantic information of the object.

The detailed object information may further include at least one of a type of object calculated based on at least one of the coordinate position, kinematic information, geometric information, c information on the object, a flight direction of the object, a flight speed of the object, a distance between the object and the aerial vehicle, and a time to collision between the object and the aerial vehicle.

The method may further include, when the object is determined to be a dangerous object, generating and outputting guidance data for the dangerous object.

The method may further include, when the object is determined to be a dangerous object, controlling the flight of the aerial vehicle to avoid the dangerous object.

In another aspect of the present disclosure, an apparatus for detecting a dangerous object for an aerial vehicle includes: an object detection area setting unit setting an object detection area in air in which the aerial vehicle is in flight using a first sensor, a second sensor, and a third sensor; an object processing unit detecting an object in the set object detection area and generating detailed object information on the detected object; and a dangerous object determination unit determining whether the detected object is the dangerous object based on the generated detailed object information.

The object detection area in the air may include a first area formed by the first sensor, a second area formed by the second sensor, and a third area formed by the third sensor.

The first area may be an area having a greater coverage than the second area and the third area, and the second area may be an area having a greater coverage than the third area.

The first sensor may be a radar, the second sensor may be a Lidar, and the third sensor may be a camera.

The dangerous object processing unit may acquire first sensing data, second sensing data, and third sensing data detected by each of the first sensor, the second sensor, and the third sensor, the first sensing data may include 2-dimensional (2D) point cloud data, the second sensing data may include 3-dimensional (3D) point cloud data, and the third sensing data may include an image.

The object processing unit generating the detailed object information on the object located between the first area and the second area may generate a first voxel map using point cloud data included in the first sensor data.

The object processing unit generating the detailed object information on the object located between the second area and the third area may generate a first voxel map using point cloud data included in the first sensor data, generate a second voxel map using point cloud data included in the second sensor data, and generate a depth map by fusing the first voxel map and the second voxel map.

The object processing unit generating the detailed object information on an object located in the third area may generate a first voxel map using point cloud data included in the first sensor data, generate a second voxel map using point cloud data included in the second sensor data, generate a depth map by fusing the first voxel map and the second voxel map, analyze the image included in the third sensor data to generate an object detection image including a bounding box indicating an area of an object in the image and information on a type of object corresponding to the bounding box, and generate a final voxel map by fusing the depth map and the object detection image.

The detailed object information may include at least one of coordinate position, kinematic information, geometric information, and semantic information of the object.

The detailed object information may further include at least one of a type of object calculated based on at least one of the coordinate position, kinematic information, geometric information, and semantic information on the object, a flight direction of the object, a flight speed of the object, a distance between the object and the aerial vehicle, and a time to collision between the object and the aerial vehicle.

The apparatus may further include, when the object is determined to be a dangerous object, an output data generation unit generating output data for guidance on the dangerous object.

The apparatus may further include, when the object is determined to be a dangerous object, a flight control data generation unit generating control data for controlling the flight of the aerial vehicle to avoid the dangerous object.

A computer program stored in a computer-readable recording medium according to an embodiment of the present disclosure for achieving the above object may include a program code for executing the above-described method of detecting a dangerous object.

In addition, a computer-readable recording medium according to an embodiment of the present disclosure for achieving the above object may have a program recorded thereon to execute the above-described method of detecting a dangerous object.

BRIEF DESCRIPTION OF DRAWINGS

FIGS. 16 to 21 are diagrams illustrating a display of the UAM aerial vehicle according to the embodiment of the present disclosure.

DETAILED DESCRIPTION

Hereinafter, detailed embodiments of the present disclosure will be described with reference to the accompanying drawings. The following detailed descriptions are provided to help a comprehensive understanding of methods, devices and/or systems described herein. However, the embodiments are described by way of examples only and the present disclosure is not limited thereto.

In describing the embodiments of the present disclosure, when a detailed description of well-known technology relating to the present disclosure may unnecessarily make unclear the spirit of the present disclosure, a detailed description thereof will be omitted. Further, the following terminologies are defined in consideration of the functions in the present disclosure and may be construed in different ways by the intention of users and operators. Therefore, the definitions thereof should be construed based on the contents throughout the specification. The terms used in the detailed description is merely for describing the embodiments of the present disclosure and should in no way be limited. Unless clearly used otherwise, an expression in the singular form includes the meaning of the plural form. In this description, expressions such as "including" or "comprising" are intended to indicate certain characteristics, numbers, steps, operations, elements, some or combinations thereof, and it should not be interpreted to exclude the existence or possibility of one or more other characteristics, numbers, steps, operations, elements, parts or combinations thereof other than those described.

In addition, terms 'first', 'second', A, B, (a), (b), and the like, will be used in describing components of embodiments of the present disclosure. These terms are used only in order to distinguish any component from other components, and features, sequences, or the like, of corresponding components are not limited by these terms.

Urban air mobility (UAM) used throughout this specification comprehensively refers to an urban transportation system that transports people and cargo using aircraft rather than ground transportation means. An airframe applied to a UAM operation may include a fixed-wing aircraft and personal air vehicle (PAV) type capable of horizontal take-off and landing, also known as vertical take-off and landing (VTOL) or conventional take-off and landing (CTOL).

More specifically, the urban air mobility (UAM) enables highly automated, passenger- and cargo-transporting air transport services in and around the urban area.

Urban air traffic is an aggregation of advanced air mobility (AAM) being developed by governments and industries. The AAM enables transportation of people and cargo in regional, local, international and urban environments. Among those, the UAM is being operated to suit movement in the urban area.

Figure 1:
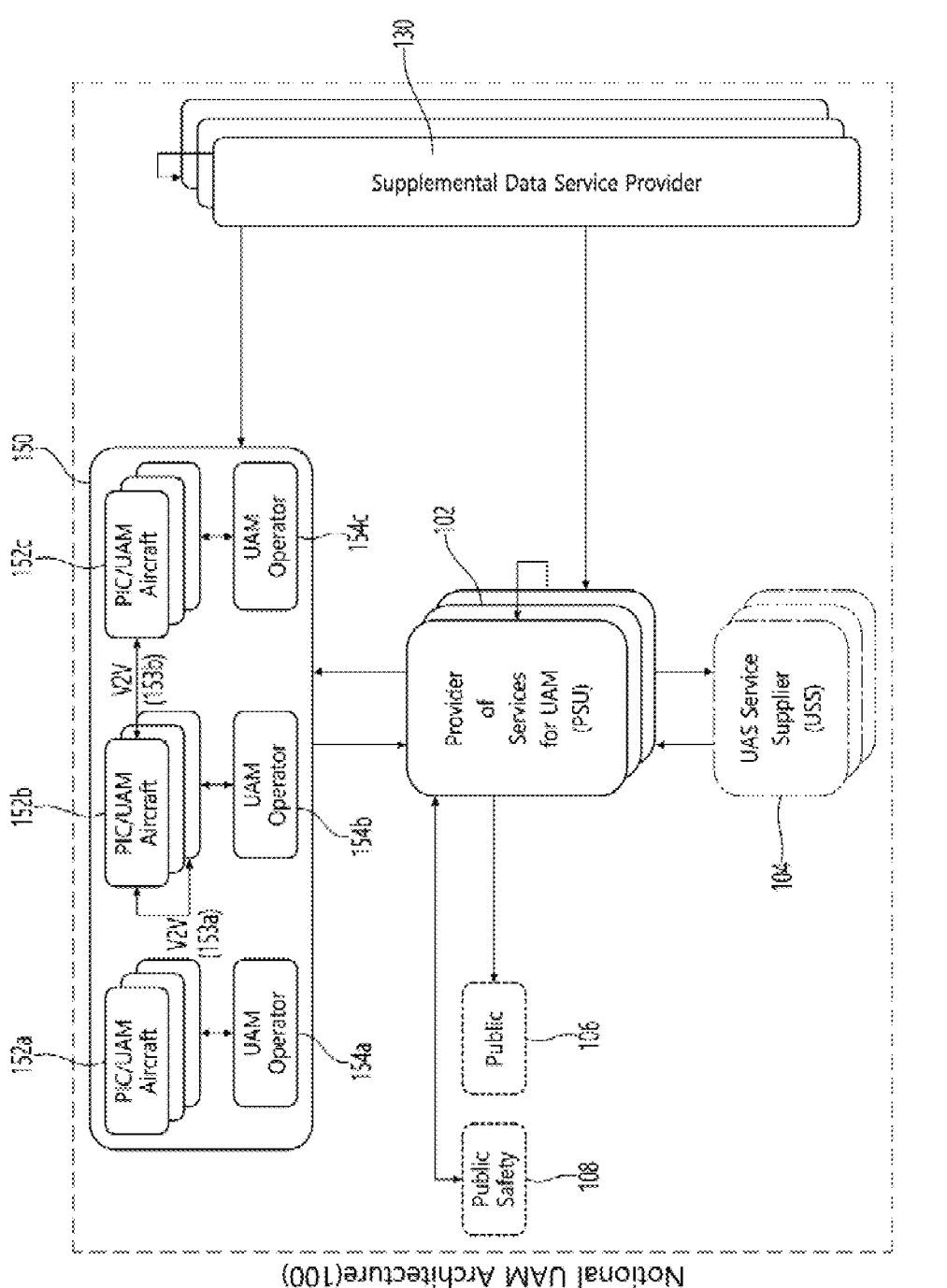
FIG. 1 is a diagram illustrating a conceptual architecture of UAM according to an embodiment of the present disclosure.

FIG. 1 is a diagram illustrating a conceptual architecture of UAM according to an embodiment of the present disclosure. Hereinafter, referring to FIG. 1, a conceptual architecture 100 of UAM that may be defined in an environment for UAM operation management will be described.

First, terms generally used in this specification will be defined to help understanding of the present disclosure.

A UAM aerodrome refers to a location where a UAM flight operation departs and arrives, a UAM aerial vehicle refers to aircraft capable of performing a UAM operation, a UAM flight corridor is a three-dimensional airspace with performance requirements for operating at a location where tactical air traffic control (ATC) separation services are not provided or are crossed, and an airspace assigned for flight of a UAM aerial vehicle to prevent collisions between a non-UAM aerial vehicle and the UAM aerial vehicle.

The UAM operation refers to transporting passengers and/or cargo from a UAM aerodrome at any one location to a UAM aerodrome at another location.

The UAM operation information includes, but not limited thereto, as information necessary for UAM operation, UAM operation identification information, UAM flight corridor information to be flown, UAM aerodrome information, and UAM operation event information (UAM aerodrome departure time, arrival time, etc.

A UAM operator represents an organization that manages overall UAM operations and performs each UAM operation. The UAM operator corresponds to a server that includes a network unit for managing a flight plan (or intent) of each UAM or a PIC UAM aerial vehicle and transmitting and receiving real-time information to and from each UAM or the PIC UAM aerial vehicle, a storage unit for storing information necessary for flight of each UAM/PIC UAM, a processor for monitoring the flight of each UAM/PIC UAM aerial vehicle and controlling autonomous flight, and a display unit for displaying a flight status of each UAM/PIC UAM aerial vehicle in real time.

An unmanned aircraft system traffic management (UTM) operator is an operator who utilizes UTM-specific services to perform low-altitude unmanned aircraft system (UAS) operation, and corresponds to a server that includes a network unit for transmitting and receiving information to and from each aerial vehicle in real time, a storage unit for storing information necessary for each flight, a processor for monitoring the flight of each aerial vehicle and controlling autonomous flight, and a display unit for displaying a flight status of each aerial vehicle in real time.

In general, since aircraft tends to comply with the regulations of ICAO and the Federal Aviation Administration (FAA), which are international organizations, this specification will also describe the UAM concept from the viewpoint of the FAA establishing regulations for safe operation of UAM.

First, in order to prevent accidents such as a midair collision between the UAM aerial vehicle or between the UAM aerial vehicle and the non-UAM aerial vehicle, it should be possible for the UAM operators to access FAA National Airspace System (NAS) data through FAA-industry data exchange protocols.

This approach enables authenticated data flow between the UAM operators and FAA operating systems. Referring to FIG. 1, UAM operators 154a, 154b, and 154c according to the present disclosure may be configured by a distributed network utilizing an interoperable information system.

In addition, the UAM operators 154a, 154b, and 154c may perform the UAM operation in a scheduled service or on-demand service method through a request of an individual customer or an intermodal operator.

The UAM operators 154a, 154b, and 154c are responsible for all aspects of regulatory compliance and UAM operational execution.

Hereinafter, the use of the term "operator" in this specification refers to an airspace user who has chosen to be operated through cooperative management within the UAM environment. More specifically, the operator may include a UAM operating system including electronic devices that include a processor, memory, database, network interface, communication module, etc., that are connected to a wired/wireless network to perform various controls and management required for the UAM operation.

The UAM operators 154a, 154b, and 154c may be closely connected to PIC/UAM aerial vehicles 152a, 152b, and 152c to exchange various information (flight corridor information, airframe condition information, weather information, aerodrome information, arrival time, departure time, map data, etc.) for flight of the plurality of PIC/UAM aerial vehicles 152a, 152b, and 152c in real time.

A volume of a group of the PIC/UAM aerial vehicles 152a, 152b, and 152c that each of the UAM operators 154a, 154b, and 154c may manage may be set differently according to the capability of the UAM operators 154a, 154b, and 154c. In this case, the capability information of the UAM operators 154a, 154b, and 154c may include the number of UAM aerial vehicles that may be accessed simultaneously, the number of UAM aerial vehicles that may be controlled simultaneously, a network traffic processing speed, processor capability of a server system, and a range of a control area, etc.

Among the plurality of PIC/UAM aerial vehicles 152a, 152b, and 152c, the PIC/UAM aerial vehicle controlled by the same UAM operators 154a, 154b, and 154c may each be grouped into one group and managed. In addition, interairframe vehicle to vehicle (V2V) communication 153a may be performed between the PIC/UAM aerial vehicles 152a, 152b, and 152c within the grouped group, and information related to operation may be shared through V2V communication between the PIC/UAM aerial vehicles 152a, 152b, and 152c included in different groups.

To determine desired UAM operational flight plan information such as location of flight (e.g., aerodrome locations), route (e.g., specific UAM corridor(s)), and desired flight time, the UAM operators 154a, 154b, and 154c acquire current status/conditions from at least one of information (environment, situational awareness information, strategic operational demand information, and UAM aerodrome availability) that a PSU 102 and a supplemental data service provider (SDSP) 130 provide.

The UAM operators 154a, 154b, and 154c should provide the flight plan and navigation data to the PSU 102 to be operated within or cross the UAM flight corridor.

In addition, the UAM operators 154a, 154b, and 154c should set planning data in advance for proper preparation when an off-nominal event occurs. The planning data includes understanding of alternative landing sites and the airspace classes bordering the UAM flight corridor(s) for operations.

When all preparations for the UAM operation are completed, the UAM operators 154a, 154b, and 154c provide the information related to the corresponding UAM operation to the PSU 102. In this case, the UAM operators 154a, 154b, and 154c may suspend or cancel the flight of the UAM aerial vehicle until a flight permission message is received from the PSU 102. In another embodiment, even if the UAM operators 154a, 154b, and 154c do not receive the flight permission message from the PSU 102, the UAM operators 154a, 154b, and 154c may start the flight of the UAM aerial vehicle by themselves.

In FIG. 1, the pilot in command (PIC) represents a case where a person responsible for operation and safety of the UAM in flight is on board the UAM aerial vehicle.

The provider of services for UAM (PSU) 102 may serve as an agency that assists the UAM operators 154a, 154b, and 154c to meet UAM operational requirements for safe and efficient use of airspace.

In addition, the PSU 102 may be closely connected with stakeholders 108 and the public 106 for public safety.

To support the capability of the UAM operators 154a, 154b, and 154c to meet the regulations and operating procedures for the UAM operation, the PSU 102 provides a communication bridge between UAMs and a communication bridge between PSUs and other PSUs through the PSU network 206.

The PSU 102 collects the information on the UAM operation planned for the UAM flight corridor through the PSU network 206, and provides the collected information to the UAM operators 154a, 154b, and 154c to confirm the duty performance capability of the UAM operators 154a, 154b, and 154c. Also, the PSU 102 receives/exchanges the information on the UAM aerial vehicles 152a, 152b, and 152c through the UAM operators 154a, 154b, and 154c during the UAM operation.

The PSU 102 provides the confirmed flight plan to other PSUs through the PSU network 206.

In addition, the PSU 102 distributes notification of an operating area in the flight plan (constraints, restrictions), FAA operational data and advisories, and weather and additional data to the UAM operators 154a, 154b, and 154c.

The PSU 102 may acquire UTM flight information through a UAS service supplier (USS) 104 network, and the USS network may acquire the UAM flight information through the PSU network 206.

In addition, the UAM operators 154a, 154b, and 154c may confirm the flight plan shared through the PSUs 102 and other UAM operators, and flight plan information for other flights in the vicinity, thereby controlling safer UAM flights.

The PSU 102 may be connected to other PSUs through the PSU networks 206 to acquire subscriber information, FAA data, SDSP data, and USS data.

The UAM operators 154a, 154b, and 154c and the PSU 102 may use the supplemental data service provider (SDSP) 130 to access support data including terrain, obstacles, aerodrome availability, weather information, and map data for a three-dimensional space. The UAM operators 154a, 154b, and 154c may access the SDSP 130 directly or through PSU network 206.

The USS 104 serves to support the UAS operation under the UAS traffic control (UTM) system.

Figure 2:
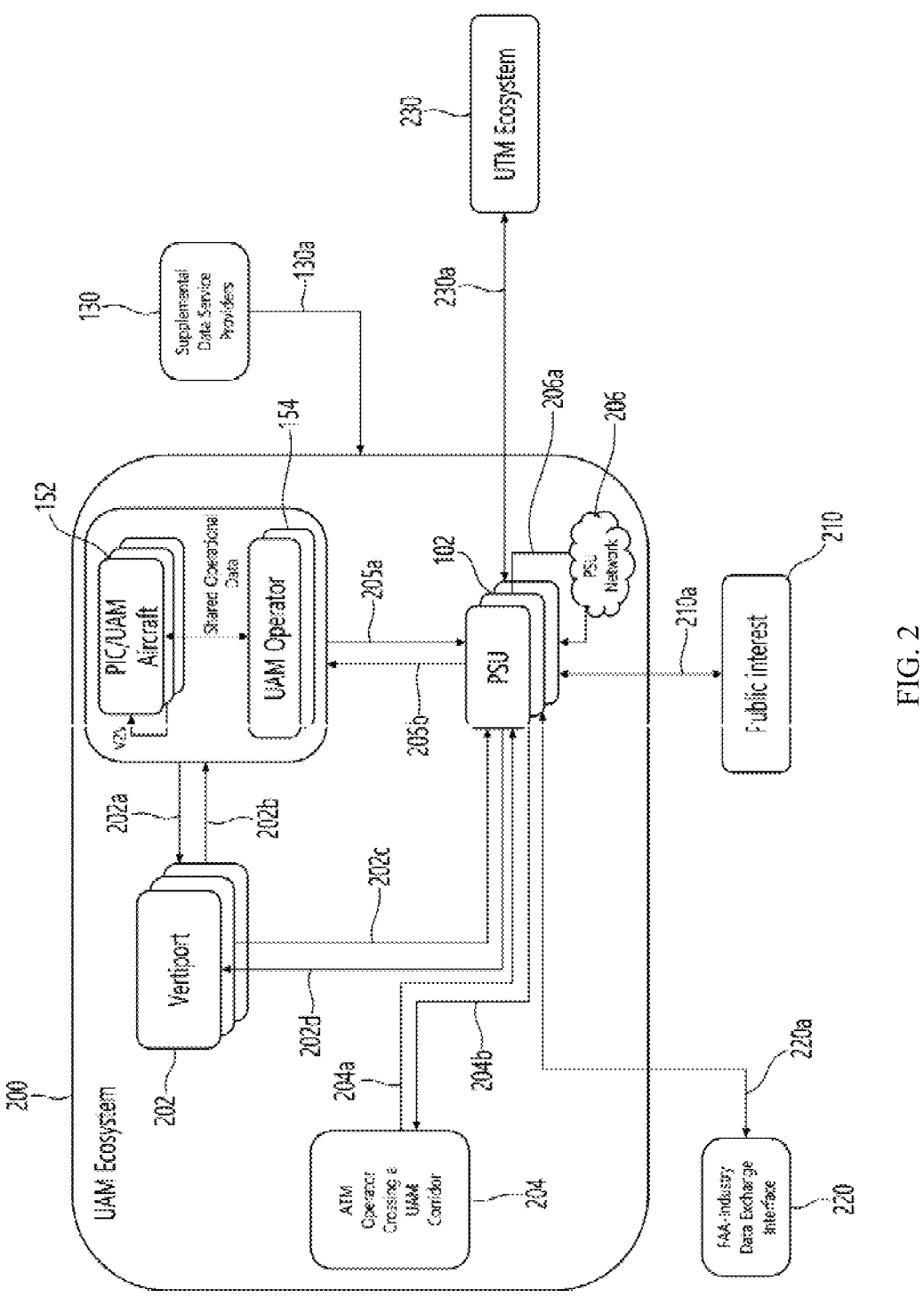
FIG. 2 is a diagram for describing an ecosystem of the UAM according to the embodiment of the present disclosure.

FIG. 2 is a diagram for describing an ecosystem of the UAM according to the embodiment of the present disclosure.

Referring to FIG. 2, the PIC/UAM aerial vehicle 152 and the UAM operator 154 transmit UAM operational intent information and UAM real-time data to a vertiport management system 202 (202a), and the vertiport management system 202 transmits vertiport capacity information and vertiport status information to the PIC/UAM aerial vehicle 152 and the UAM operator 154 (202b).

In addition, the PIC/UAM aerial vehicle 152 and the UAM operator 154 transmit a UAM operational intent request message, UAM real-time data, and UAM operation departure phase status information to the PSU 102 (205a).

The PSU 102 transmits UAM notifications, UAM corridor information, vertiport status information, vertiport acceptance information, and UAM operation intent response message to the PIC/UAM aerial vehicle 152 and the UAM operator 154 (205b). In this case, the UAM operational intent response message includes a response message informing of approval/deny, etc., for the UAM operational intent request.

The vertiport management system 202 transmits the UAM operation departure phase status information, the vertiport status information, and the vertiport acceptance information to the PSU 102 (202c). The PSU 102 transmits the UAM operational intent information and UAM real-time data to the vertiport management system 202 (202d).

In FIG. 2, when aerial vehicles (that is, non-UAMs) other than the UAM aerial vehicles need to cross the UAM flight corridor, the ATM operator 204 crossing the UAM flight corridor transmits a UAM flight corridor crossing request message to the PSU 102 (204a), and the PSU 102 transmits a response message to the UAM flight corridor crossing request message (204b).

In addition, in FIG. 2, the PSU 102 may perform a procedure for synchronizing UAM data with PSUs connected through the PSU network 206.

In particular, the PSU 102 may exchange information with other PSUs through the PSU network 206 to enable UAM passengers and UAM operators to smoothly provide UAM services (e.g., exchange of flight plan information, notification of UAM flight corridor status, etc.).

In addition, the PSU 102 may prevent risks such as collisions with the UAM aerial vehicle and the unmanned aerial vehicle, and transmit and receive UAM off-nominal operational information and UTM off-nominal operational information to and from the UTM ecosystem 230 for smooth control in real time (230a).

In addition, the PSU 102 shares FAA and UAM flight corridor availability, UAM flight corridor definition information, NAS data, a UAM information request, and response to the UAM information request, UAM flight corridor status information, and UAM off-nominal operational information through the FAA industrial data exchange interface 220 (220a).

In addition, the PSU 102 may transmit and receive the UAM information request and the response to the UAM information request to and from a public interest agency system 210. The public interest agency system 210 may be an organization defined by a management process (e.g., FAA, CBR) to have access to the UAM operation information. This access may support activities that include public right to know, government regulation, government guaranteed safety and security, and public safety. Examples of public interest stakeholders include regional law enforcement agencies and United States federal government agencies.

In addition, the UAM ecosystem 200 may receive supplemental data such as terrain information, weather information, and obstacles from supplemental data service providers (SDSP) 130 (130a), and thus, generate information necessary for safe operation of the UAM aerial vehicle.

In an embodiment of the present disclosure, the PSU 102 may confirm a corresponding UAM flight corridor use status through UAM flight corridor use status (e.g., active, inactive) information. For example, when the UAM flight corridor use status information is set to "active," the PSU 102 may identify whether the UAM flight is scheduled or whether the UAM aerial vehicle is currently flying in the corresponding flight corridor, and when the UAM flight corridor use status information is set to "inactive", the PSU 102 may identify that there is no UAM aerial vehicle currently flying in the corresponding flight corridor.

In addition, the PSU 102 may store operation data related to the flight of the UAM aerial vehicle in an internal database in order to identify a cause of an accident of the UAM aerial vehicle in the future.

These key functions allow the PSU 102 to provide the FAA with cooperative management of the UAM operation without being directly involved in UAM flight.

The PSU 102 may perform operations related to flight planning, flight plan sharing, strategic and tactical conflict resolution, an airspace management function, and an off-nominal operation.

Figure 3:
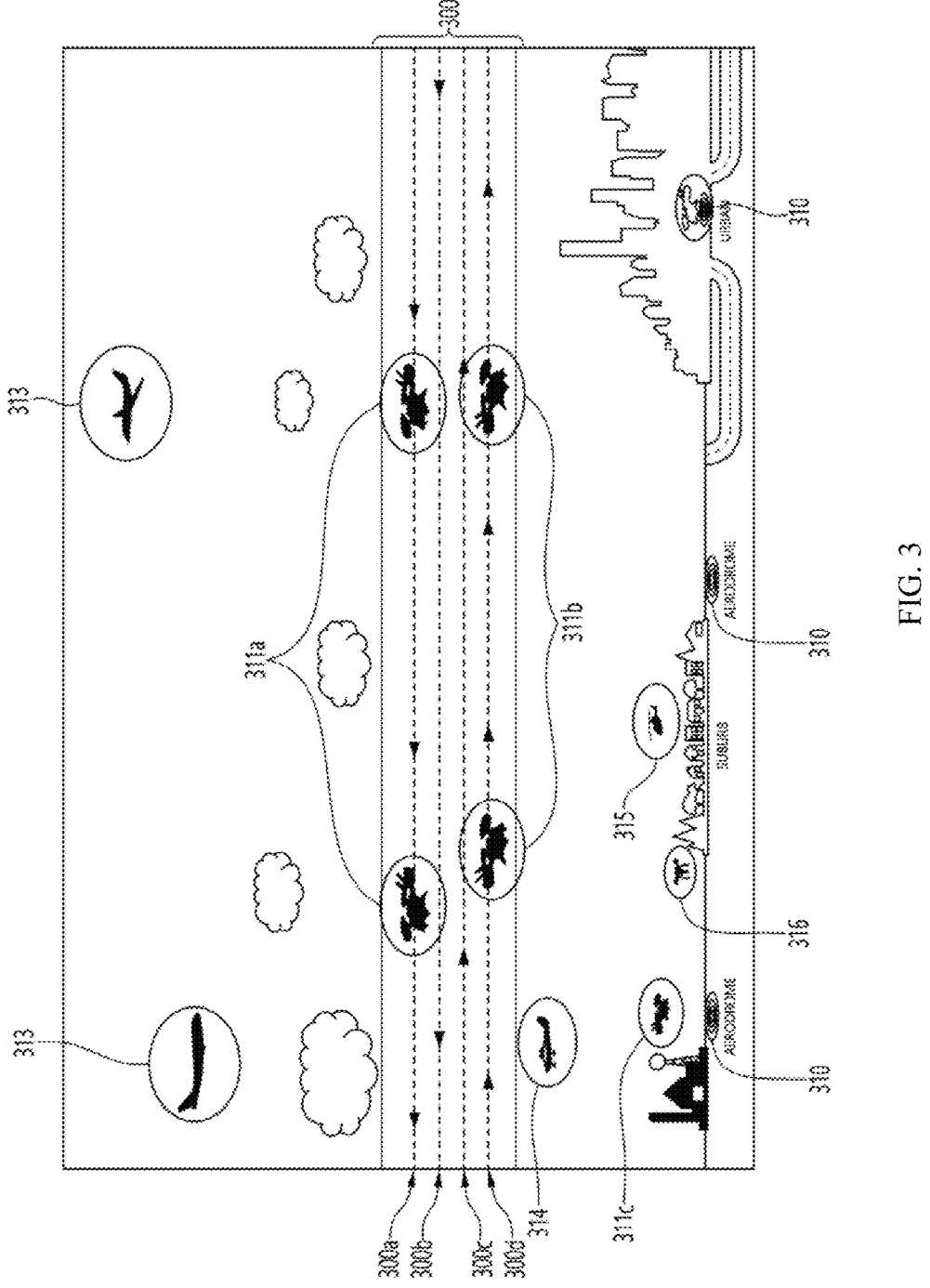
FIG. 3 is a diagram for describing locations of tracks and aerodromes flying by UAM aerial vehicles in a flight corridor of the UAM according to the embodiment of the present disclosure.
Figure 4:
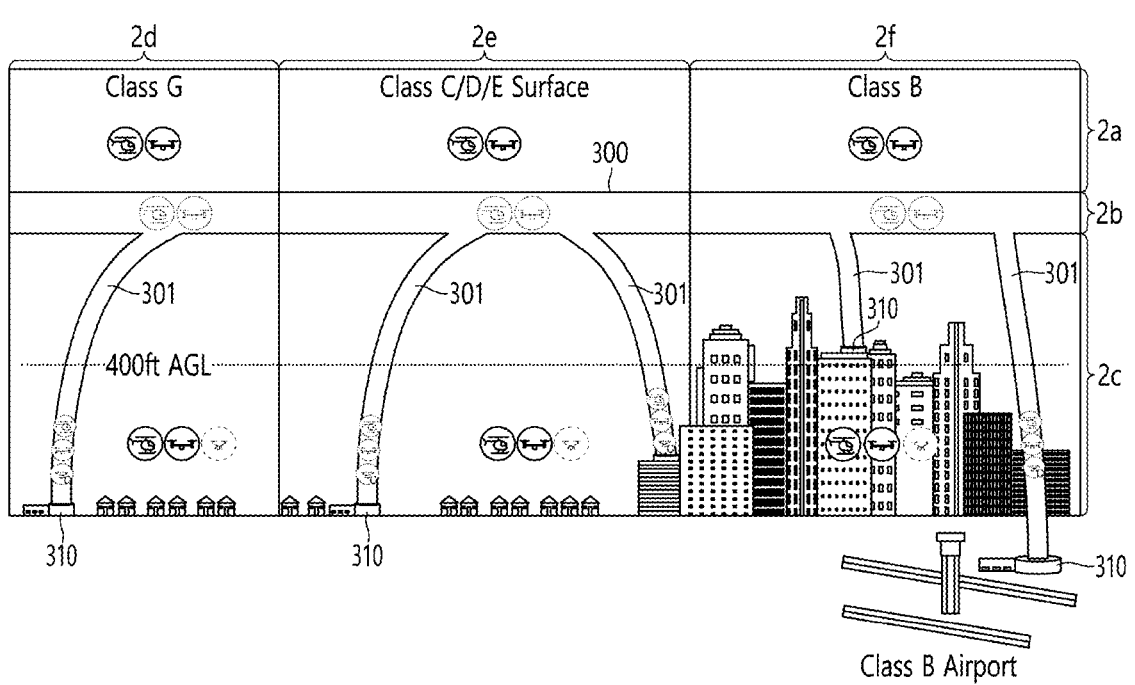
FIGS. 4 and 5 are diagrams illustrating the UAM flight corridor according to the embodiment of the present disclosure.
Figure 5:
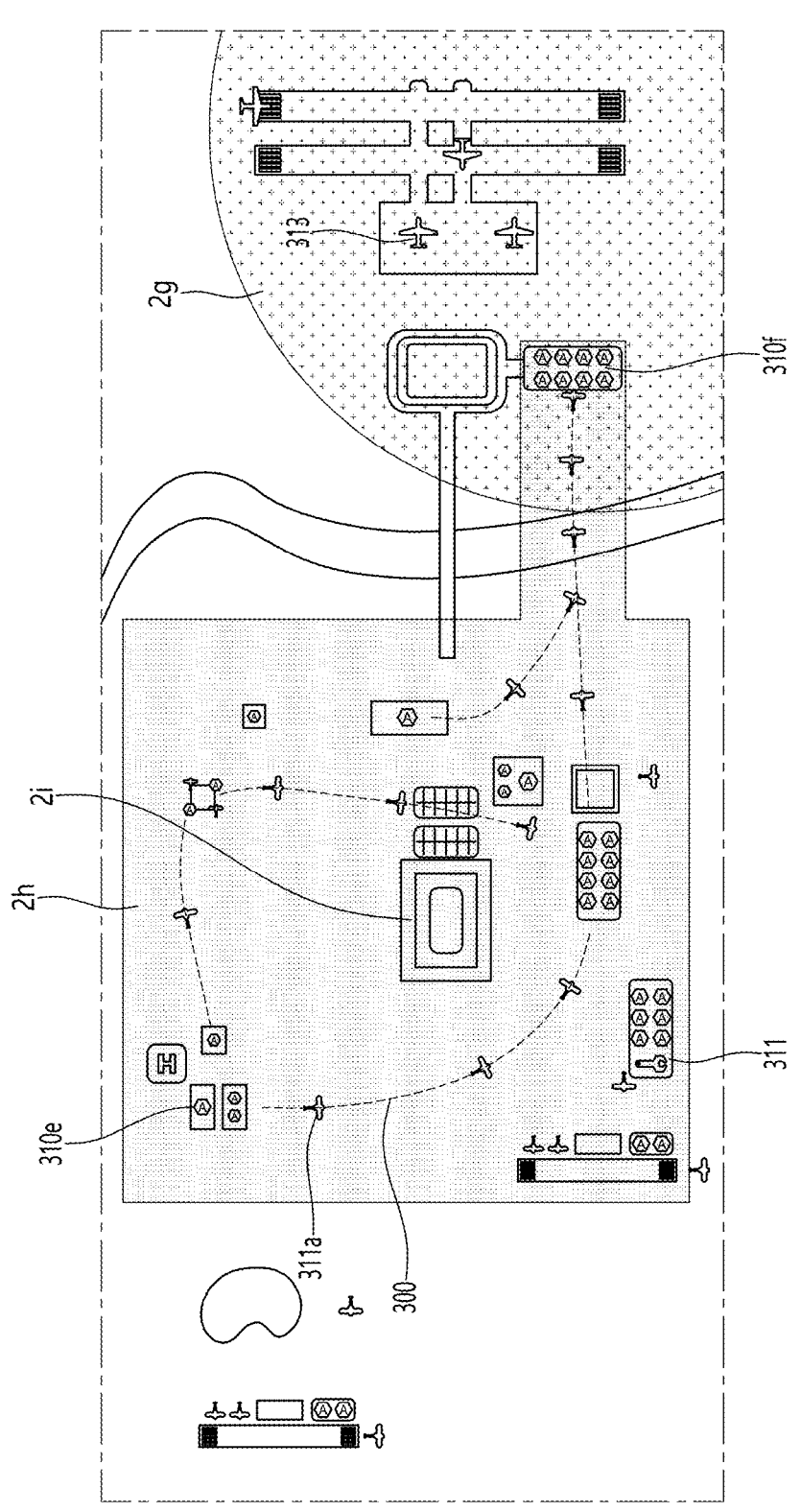

FIG. 3 is a diagram for describing locations of tracks and aerodromes on which UAMs fly within a UAM flight corridor according to an embodiment of the present disclosure, and FIGS. 4 and 5 are diagrams illustrating the UAM flight corridor according to the embodiment of the present disclosure.

It will be described with reference to FIGS. 3 to 5 below.

Referring to FIG. 3, for efficient and safe flight of UAM aerial vehicles 311a and 311b within a UAM flight corridor 300 according to an embodiment of the present disclosure, a plurality of tracks 300a, 300b, 300c, and 300d are provided within the corresponding flight corridor. Each of the tracks 300a, 300b, 300c, and 300d has different altitudes to prevent a collision between the UAM aerial vehicles 311a and 311b, and the number of tracks will be differently set depending on the capacity of the corresponding flight corridor 300.

A UAM aerodrome 310 is an aerodrome that meets capability requirements to support UAM departure and arrival operations. The UAM aerodrome 310 provides current and future resource availability information for UAM operations (e.g., open/closed, pad availability) to support UAM operator planning and PSU strategic conflict resolution. The UAM operator 154 may directly use the UAM aerodrome 310 through the PSU network 206 or through the SDSP 130.

In FIG. 3, the UAM flight corridor 300 should be set to enable the safe and efficient UAM operation without a tactical ATC separation service. Therefore, the UAM flight corridor 300 should be set in relation to the capabilities (e.g., aerial vehicle performance, UAM flight corridor structure, and UAM procedure) of the UAM operator 154.

Additionally, the PSU 102 or the UAM operator 154 may be operated differently within the UAM flight corridor 300 according to operation performance (e.g., aircraft performance envelope, navigation, detection-and-avoidance (DAA)) and participation conditions (e.g., flight intention sharing, conflict resolution within the UAM corridor) of the UAM flight corridor 300.

In addition, the PSU 102 or the UAM operator 154 may set performance and participation requirements of the UAM flight corridor 300 differently between the UAM corridors.

Specifically, the PSU 102 or the UAM operator 154 may variably set the range (flight altitude range) of the UAM flight corridor 300 in consideration of information such as the number of UAM aerial vehicles using the corresponding UAM flight corridor 300, an occupancy request of managements systems (e.g., UTM, ATM) for other aerial vehicles for the corresponding airspace, a no-fly zone, and a flight limit altitude.

In addition, the PSU 102 or the UAM operator 154 may share, as the status information for the set UAM flight corridor 300, the UAM flight information (flight time, flight altitude, track ID within the flight corridor, etc.) within the UAM flight corridor with other UAM operators and/or PSUs through the PSU network 206.

Also, the PSU 102 or the UAM operator 154 may set the number of tracks 300a, 300b, 300c, and 300d in the flight corridor according to the range of the UAM flight corridor 300. It is preferable that the corresponding tracks 300a, 300b, 300c, and 300d are defined to have a safe guard set so that the PIC/UAM aerial vehicle 152 flying along the corresponding tracks does not collide with each other. Here, the safe guard may be set according to the height of the UAM aerial vehicle, or even when the UAM aerial vehicle temporarily deviates from a track assigned thereto due to a bird strike or other reasons, the safe guard may be a space set so as not to collide with other UAM aerial vehicles flying on the nearest neighbor track above and below the corresponding track.

In addition, the PSU 102 or the UAM operator 154 may set the tracks 300a, 300b, 300c, and 300d within the flight corridor according to the range of the UAM flight corridor 300, assign a track identifier (Track ID), which is an identifier in the flight corridor 300 for distinguishing the set tracks, and notify the PIC/UAM aerial vehicle 152 scheduled to fly within the corresponding UAM flight corridor 300 of the assigned track ID.

As a result, the PSU 102 or the UAM operator 154 may monitor in real time whether the PIC/UAM aerial vehicle 152 flying in the corresponding flight corridor 300 are flying along each assigned track ID, and when the PIC/UAM aerial vehicle 152 deviate from the assigned track ID, the PSU 102 or the UAM operator 154 may transmit a warning message to the corresponding PIC/UAM aerial vehicle 152, or remotely control the corresponding PIC/UAM aerial vehicle 152.

In the operating environment of the National Airspace System (NAS), the operation type, regulations and procedures of the airspace may be defined to enable the operation of the aerial vehicle, so the airspace according to the operating environment of the UAM, UTM, and air traffic management (ATM) may be defined as follows.

A UAM aerial vehicle 311 may be operated in the flight corridor 300 set above the area in which the UAM aerodromes 310 are located. In this case, the UAM aerial vehicle 311 may be operated in the above-described operable area based on the performance predefined in designing the airframe.

The unmanned aerial system traffic management (UTM) supports the safe operation of the unmanned aerial system (UAS) in an uncontrolled airspace (class G) below 400 ft (120 m) above ground level (AGL) and controlled airspaces (class B, C, D and, E).

On the other hand, the air traffic management (ATM) may be applied in the whole airspace.

In order to operate the UAM aerial vehicle 311, a fixed-wing aircraft 313, and helicopters 315 inside and outside the UAM flight corridor 300 according to the embodiment of the present disclosure, all aircrafts within the UAM flight corridor 300 operate under the regulations, procedures and performance requirements of the UAM. The case of the fixed-wing aircraft 313 and the aircraft controlled by the UTM may cross the UAM flight corridor 300.

In addition, it is preferable that the helicopter 315 and the UAM aerial vehicle 311 are operated in the UAM flight corridor 300, and outside the UAM flight corridor 300, in the outside of the UAM flight corridor 300, the helicopter 315 and the UAM aerial vehicle 311 comply with the operation form, the airspace class, and the flight altitude according to the regulations for the air traffic management (ATM) and the regulations for the UTM.

Of course, the same regulations as described above are applied to visual flight rules (VFR) 314 or unmanned drones 316 in which a pilot recognizes surrounding obstacles with his eyes and flies in a state in which a surrounding visual distance is wide.

The operation of each aerial vehicle described above does not depend on the airspace class, and may be applied based on the inside and outside of the flight corridor 300 of the UAM. Meanwhile, the airspace class may be classified according to purpose such as a controlled airspace, an uncontrolled airspace, a governed airspace, and an attention airspace, or classified according to provision of air traffic service.

The UAM flight corridor 300 allows the UAM aerial vehicle to be operated more safely and effectively without the technical separation control service (management of interference with other aerial vehicles for safety) according to the ATM. In addition, it is possible to help accelerate the operating tempo related to the operating capability, structure, and procedures of the UAM aerial vehicle. In addition, in the present disclosure, by defining the UAM flight corridor 300, it is possible to provide a clearer solution to agencies having an interest in the related field.

The UAM flight corridor 300 may be designed to minimize the impact on the existing ATM and UTM operations, and should be designed to not only consider the regional environment, noise, safety, and security, but also satisfy the needs of customers.

In addition, the effectiveness of the UAM flight corridor 300 should be consistent with the operation design (e.g., changing the flight direction during take-off and landing at a nearby airport or setting direct priority between opposing aircraft) of the ATM. Of course, the UAM flight corridor 300 may be designed to connect the locations of the UAM aerodromes 310 located at two different points for point-to-point connection.

The UAM aerial vehicle 311 may fly along a take-off and landing passage 301 connecting the flight corridor 300 in the aerodrome 310 to enter the UAM flight corridor 300, and the take-off and landing passage 301 may also be designed in a way that minimizes the impact on ATM and UTM operations and should be designed in a way that satisfies the requirements of customers as well as considering the regional environment, noise, safety, security, etc.

The airspace or operation separation within the UAM flight corridor 300 may be clarified through a variety of strategies and technologies. As a preferred embodiment for the airspace or operation separation within the UAM flight corridor 300, a collision may be strategically prevented based on a common flight area, and an area may be technically assigned to the UAM operator 154. In this case, in an embodiment of the present disclosure, PIC and aircraft performance or the like may be considered when separating the airspace or operation within the UAM flight corridor 300.

In addition, since the UAM operator 154 is responsible for safely conducting the UAM operation in association with aircraft, weather, terrain and hazards, it is also possible to separate the UAM flight corridor 300 through the shared flight intention/flight plan, awareness, strategic anti-collision, and establishment of procedural rules.

For example, it can be seen that the UAM flight corridor 300 in FIG. 3 is separated into two airspaces based on the flight direction of the UAM aerial vehicle 311*a* and 311*b*. In this case, in FIG. 3, in a relatively high airspace within the UAM flight corridor 300, the UAM aerial vehicle 311*a* may fly in one direction (from right to left), and in a relatively low airspace, the UAM aerial vehicle 311*b* may fly in a direction (from left to right) opposite to the one direction.

Meanwhile, the UAS service provider (USS) 104 and the SDSP 130 may provide the UAM operator 154 with weather, terrain, and obstacle information data for the UAM operation.

The UAM operator 154 may acquire the data at the flight planning stage to ensure updated strategic management during the UAM operation and flight, and the UAM operator 154 may continuously monitor the weather during the flight based on the data to make a plan or take technical measures to prevent emergencies such as collisions from occurring within the flight corridor.

Accordingly, the UAM operator 154 is responsible for identifying operation conditions or flight hazards that may affect the operation of the UAM, and this information should be collected during flight as well as pre-flight to ensure safe flight.

The PSU 102 may provide other air traffic information scheduled for cross operation within the UAM flight corridor 300, meteorological information such as meteorological wind speed and direction, information on hazards during low altitude flight, information on special airspace status (airspace prohibited areas, etc.), the availability for the UAM flight corridor 300, etc.

In addition, during the UAM operation, the identification information and location information of the UAM aerial vehicle 311 may be acquired through a connected network between the UAM operator 154 and the PSU 102, but is not preferably provided by automatic dependent surveillance-broadcast (ADS-B) or transponder.

Since the operation of UAM ultimately aims at the unmanned autonomous flight, the identification information and location information of the UAM aerial vehicle 311 are acquired or stored by the UAM operator 154 and the PSU 102, and are preferably used for the operation of the UAM.

Meanwhile, referring to FIG. 4, due to the characteristics of UAM that is operated to suit urban and suburban environments, the aerodrome 310 may be installed in several densely populated regions, and each aerodrome 310 may set a take-off and landing passage 301 connected to the UAM flight corridor 300.

The airspace according to the embodiment of the present disclosure may be divided into an airspace 2*a* of an area in which the fixed-wing aircraft 313 and rotary-wing aircraft 315, etc., are allowed to fly only according to the instrument flight Rules (IFR) vertically depending on altitude, an airspace 2*b* in which the UAM flight corridor 300 is formed and airspace 2*c* in which the take-off and landing passage 301 of the UAM aerial vehicle is formed.

The aerial vehicle illustrated in FIG. 4 may be divided into a UAM aerial vehicle (dotted line) flying in the UAM flight corridor 300, an aerial vehicle (solid line) flying in the airspace according to the operating environment of the air traffic management (ATM), and an aerial vehicle (unmanned aircraft system) (UAS) (dashed line) flying at low altitude operated by the unmanned aircraft system traffic management (UTM) operator.

The airspace according to the embodiment of the present disclosure may be horizontally divided into a plurality of airspaces 2*d*, 2*e*, and 2*f* according to the above-described airspace class.

Also, referring to FIG. 5, the airspace may be divided into an airspace 2*g* divided into an existing air traffic control (ATC) area and an area 2*h* where UAM operation or control is performed according to the operation or control area. Of course, the ATC control area 2*g* and the UAM operation or control area 2*h* may overlap depending on circumstances.

In the area 2*h* where the UAM operation or control is performed, a plurality of aerodromes 310*e* and 310*f* may exist for the point-to-point flight of the UAM aerial vehicle 311, and a no-fly zone 2*i* may be set in the area 2*h* where the UAM operation or control is performed.

The UAM flight corridor 300 for the point-to-point flight may be set within the area 2*h* where the UAM operation or control is performed, except for the area set as the no-fly zone 2*i*.

Figure 6:
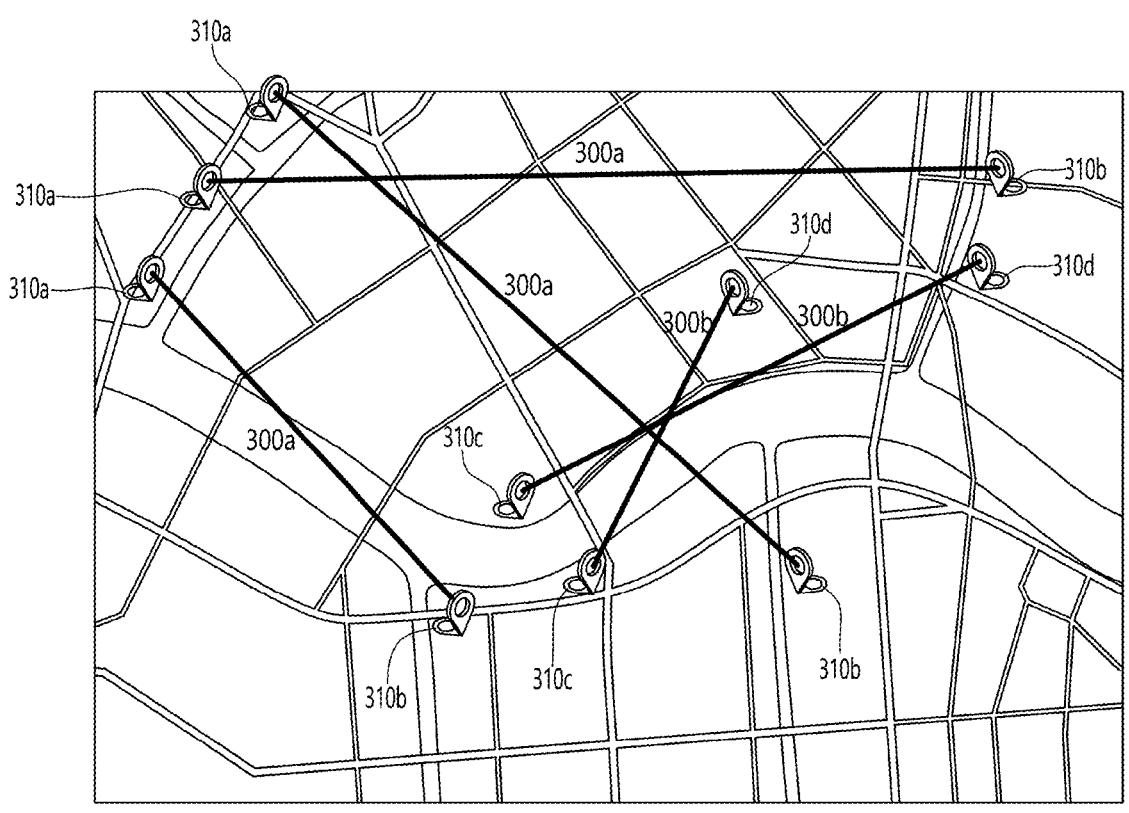
FIG. 6 is a diagram illustrating the flight corridor of UAM for a point to point connection according to an embodiment of the present disclosure.

FIG. 6 is a diagram illustrating the aviation corridor of UAM for the point to point connection according to an embodiment of the present disclosure.

This will be described with reference to FIG. 6 below.

The flight corridors 300*a* and 300*b* of the UAM aerial vehicle may connect an aerodrome 310*a* in one region and an aerodrome 310*b* in another region. The connection between these points may be established within an area excluding special airspace such as the no-fly zone 2*i* within the area 2*h* where the above-described UAM operation or control is performed, and the altitude at which the UAM flight corridor 300 is set may be set within the airspace 2*b* in which the UAM flight corridor 300 is set. Here, the aerodrome 310 may refer to, for example, a vertiport in which an aerial vehicle capable of vertical take-off and landing may take-off and land.

Hereinafter, the operation of the above-described UAM will be described.

The UAM may be operated in consideration with the operation within the UAM flight corridor 300, the strategic airspace separation, the real-time information exchange between the UAM operator 154 and the UAM aerial vehicle 311, the performance conditions of the UAM airframe, etc.

The flight of the UAM may be generally divided into a stage of planning a flight in a pre-flight stage, a take-off stage in which the UAM takes off from the aerodrome 310 and enters a vertical take-off and landing passage 51 and climbs, a climb stage in which the UAM climbs from the aerodrome 310 and enters the flight corridor 300, a cruise stage in which the UAM moves along the flight corridor 300, a descend and landing stage in which the UAM enters the take-off and landing passage 51 from the flight corridor 300, and then, descends and enters the aerodrome 310, a disembarking stage after flight, and operation inspection stage.

The operation in each stage may be performed by being divided into the UAM operator 154, the PSU 102 (or SDSP 130), the FAA, the aerodrome operator, and the PIC/UAM passenger. The PIC/UAM passenger may be understood as a concept including both a person who boards the airframe and controls the airframe and passengers who move through the airframe.

In the pre-flight planning stage, the UAM operator 154 may submit the flight plan to the FAA and confirm the passenger list and destination.

The PSU 102 may remove factors that may hinder flight or plan a strategy for the case where an off-nominal situation occurs.

The FAA may review the flight plan submitted by the UAM operator 154 to determine whether to approve the operational plan, and transmit the determination back to the UAM operator 154.

The aerodrome operator may inspect passengers and cargo, perform boarding of passengers, confirm whether the area around the aerodrome 310 is cleared for departure, and notify the UAM operator 154 and/or the PSU 102 of the information on the confirmed result.

The PIC/UAM passenger may finally confirm all hardware and software systems of the UAM aerial vehicle 311 for departure, and notify the UAM operator 154 and/or the PSU 102 through a communication device.

After the FAA notifies the approval of the UAM operation plan, it maintains the authority for the airspace in which the flight route is established in the PIC/UAM flight, but the UAM operators 154 who actually operate the UAM aerial vehicle and/or the PSU 102 directly control/govern the UAM flight operation, so it is preferable that the FAA does not actively participate in the UAM flight.

In addition, in the take-off stage in which the UAM aerial vehicle takes off the aerodrome 310 and climbs, the UAM operator 154 may approve a taxi request or a take-off request of a runway of an airport of the UAM aerial vehicle and transmit a response message thereto to each UAM.

The PSU 102 may sequentially assign priority to each of the plurality of UAM aerial vehicles to prevent the collision between the UAM aerial vehicles and to smoothly control the aerodrome. The PSU 102 controls and monitors only the UAM aerial vehicle to which priority is assigned to move to the runway or take-off.

Before taking off of the UAM aerial vehicle, the aerodrome operator may confirm the existence of obstacles that hinder the takeoff of the UAM around the aerodrome, and may approve the takeoff of the UAM aerial vehicle if there are no obstacles. The PIC/UAM passenger who has received the take-off approval may proceed with the take-off procedure of the UAM aerial vehicle.

In the climb stage in which the UAM aerial vehicle enters the take-off and landing passage 301 from the aerodrome 310, and then climbs and enters the flight corridor 300 and the cruise stage in which the UAM aerial vehicle moves along the flight corridor 300, the UAM operator 154 monitors whether the PIC/UAM is flying according to the flight plan or whether the overall flight operation plan is being followed. In addition, the UAM operator 154 may monitor the status of the UAM aerial vehicle 311 while exchanging data with the PSU 102 and the UAM aerial vehicle 311 in real time and update information and the like if necessary.

The PSU 102 may also monitor the status of the UAM aerial vehicle 311 while exchanging data with the UAM operator 154 and the UAM aerial vehicle 311 in real time, and may deliver the updated operation plan to the UAM operator 154 and the UAM aerial vehicle 311, if necessary.

When the UAM aerial vehicle 311 enters the cruise stage, the aerodrome operator no longer actively participates in the flight of the UAM aerial vehicle 311. In addition, the PIC/UAM aerial vehicle 311 may execute the take-off and cruise procedures, perform collision avoidance or the like through the V2V data exchange, monitor the system of the aerial vehicle in real time, and provide the UAM operator 154 and the PSU 102 with the information such as the aircraft status.

In the descending and landing stage, since the UAM aerial vehicles 152 and 311 have reached near a destination, the cruise mode is terminated and descends and enters the aerodrome 310 after entering the take-off and landing passage 301 from the flight corridor 300. Even during the descend and landing stage, the UAM operator 154 may continuously monitor the flight status/airframe status of the UAM aerial vehicles 152 and 311 and at the same time, monitor whether the flight of the UAM aerial vehicles 152 and 311 complies with a predefined flight operation plan.

In addition, the UAM aerial vehicles 152 and 311 may be assigned a gate number or gate identification information to land on the aerodrome through communication with the aerodrome operator while entering the take-off and landing passage 301, and confirm whether the current airframe status is ready for landing (landing gear operation, flaps, rotor status, output status, etc.).

The PSU 102 may request the approval of the landing permission of the UAM aerial vehicle 311 from the aerodrome operator, and transmit, to the UAM aerial vehicle 311, information including compliance matters for moving from the current flight corridor or location of the UAM aerial vehicle 311 to the UAM aerodrome 310 permitted to land.

In addition, the UAM aerial vehicle 311 may confirm whether the aerodrome 310 is in a clear status (status in which all elements that may be obstacles to the landing of the UAM aerial vehicle 311 are removed) through communication with the UAM aerodrome 310, the PSU 102, and the UAM operator 154, and after the landing of the UAM aerial vehicle 311 is completed, the UAM aerial vehicle 311, the PSU 102, and the UAM operator 154 may all identify the end of the flight operation of the corresponding UAM aerial vehicle.

When receiving the landing request from the UAM aerial vehicle 311, the aerodrome operator confirms a gate cleared out of the aerodrome. In addition, when the aerodrome operator secures whether the landing is possible for the confirmed gate, the aerodrome operator transmits landing permission message including the gate ID or gate number to the UAM aerial vehicle 311, and assigns a gate corresponding to a landing zone included in the landing permission message to the UAM aerial vehicle 311.

Also, when receiving the landing permission message from the aerodrome operator, the UAM aerial vehicle 311 lands at a gate assigned thereto according to a predetermined landing procedure.

The PIC/UAM passengers may perform the take-off and landing procedure of the UAM aerial vehicle 311, and may perform procedures of preventing collisions with other UAM aerial vehicles while maintaining V2V communication and moving to a runway after landing.

The stage of planning the flight of the UAM aerial vehicle 311 starts with receiving the flight requirements of the UAM aerial vehicle 311 for the UAM operator 154 to fly point to point between the first aerodrome and the second aerodrome. In this case, the UAM operator 154 may receive data (e.g., weather, situation awareness, demand, UAM aerodrome availability, and other data) for the flight of the UAM aerial vehicle 311 from the PSU 102 or SDSP 130.

In all the stages related to the UAM operation, the UAM operator 154 and the PSU 102 not only need to confirm the identification and location information of the UAM aerial vehicle in real time, but also the PIC/UAM and UAM operator 154 needs to monitor the performance/condition of the aerial vehicle in real time to identify whether the flight status of the UAM aerial vehicle 311 is off-nominal.

Meanwhile, the UAM aerial vehicle 311 may have an off-nominal status for various reasons such as weather conditions and airframe failure. The off-nominal status may refer to an operating situation in which the UAM aerial vehicle 311 does not follow a flight plan planned before flight due to various external or internal factors.

Two cases may be assumed as the case in which the off-nominal flight condition occurs in the UAM aerial vehicle 311. The first case is a case where the PIC/UAM aerial vehicle 152 intentionally does not comply with UAM regulations due to any other reason, and the second case is the unintentional non-compliance with the UAM operating procedures due to contingencies.

In the first case, it may be assumed that the case where the UAM aerial vehicle 311 intentionally (or systematically) does not comply with the planned UAM operating regulations is the case where the UAM aerial vehicle 311 does not comply with the planned flight operation due to airframe performance problems, strong winds, navigation failure, etc.

However, in the first case, the PIC/UAM aerial vehicle 152 may be in a state in which it may safely arrive at the planned aerodrome 310 within the flight corridor 300.

When the PSU 102 identifies that the off-nominal operation according to the first case has occurred in the PIC/UAM aerial vehicle 152, the PSU 102 distributes, to each stakeholder (UAM operator 154, USS 104, vertiport operator 202, UTM ecosystem 230, ATM operators 204, etc.) through a wired/wireless network, PIC/UAM aerial vehicle off-nominal event occurrence information (UAM aerial vehicle identifier where an off-nominal event occurred, UAM aerial vehicle locations (flight corridor identifier, track identifier), information (event type) notifying a type of off-nominal situations, etc.) notifying that an off-nominal operation status has occurred in the PIC/UAM aerial vehicle 152.

In addition, the UAM operator 154 and the PSU 102 receiving the PIC/UAM aerial vehicle off-nominal event occurrence information may generate a new UAM operation plan that may satisfy UAM community based rules (CBR) and performance requirements for operation within the flight corridor 300, and distribute the generated new UAM operation plan to stakeholders again.

In the second case, the case where the UAM aerial vehicle 152 unintentionally does not comply with the UAM operation due to an accidental situation may be a state in which the forced landing (crash landing) of the UAM aerial vehicle 152 is required, and may be a severe situation where planned flight operation may not be performed.

That is, the second case is the case where, since it is difficult for the PIC/UAM aerial vehicle 152 to safely fly to the planned aerodrome 310 within the flight corridor 300 assigned thereto, the PIC/UAM aerial vehicle 152 may not fly within the flight corridor 300 assigned thereto.

When the off-nominal operation according to the second case has occurred, similar to the first case, the PSU 102 distributes, to each stakeholder (UAM operator 154, USS 104, vertiport operator 202, UTM ecosystem 230, ATM operators 204, etc.) through the wired/wireless network, the PIC/UAM aerial vehicle off-nominal event occurrence information (UAM aerial vehicle identifier where an off-nominal event occurred, UAM aerial vehicle locations (flight corridor identifier, track identifier), information (event type) notifying a type of off-nominal situations, etc.) notifying that an off-nominal operation status has occurred in the PIC/UAM aerial vehicle 152.

In addition, the PIC/UAM aerial vehicle 152 is reassigned a new flight corridor 300 for flight to a previously secured landing spot and a track identifier within the flight corridor 300 in preparation for an emergency situation in the UAM aerial vehicle, and at the same time, may fly in a flight mode to avoid collision damage with other aerial vehicles through communication means (ADS-B, etc.).

Hereinafter, an evaluation indicator for the operation of the UAM aerial vehicle according to an embodiment of the present disclosure will be described.

As shown in <Table 1> below, UAM operational evaluation indicators may include major indicators such as operation tempo, UAM structure (airspace and procedures), UAM regulatory changes, UAM community regulations (CBR), aircraft automation level, etc.

TABLE 1

| Indicator Item | Description |
| --- | --- |
| Operation Tempo | It indicates density of UAM operation, frequency of UAM operation, and complexity of UAM operation. |
| UAM Operation Structure (Airspace and Procedure) | It indicates complex level of infrastructure and services supporting UAM operating environment. |
| UAM Operation Regulation | It indicates level of evolution of current regulations required for UAM operation structure and performance. |
| UAM Community Laws and Regulations | It indicates rules supplementing UAM operation regulations for UAM operation and expansion of PSU. |
| Aircraft Automation Level | It may be divided into HWTL (Human-Within-The-Loop), HOTL (Human-On-The-Loop), HOVTL ( Human-Over-The-Loop). 1) HWTL: Stage where person directly controls UAM system 2) HOTL: Stage of system that is controlled under human supervision, i.e., stage in which human actively monitors 3) HOVTL : Stage in which human performs monitoring passively |

Figure 7:
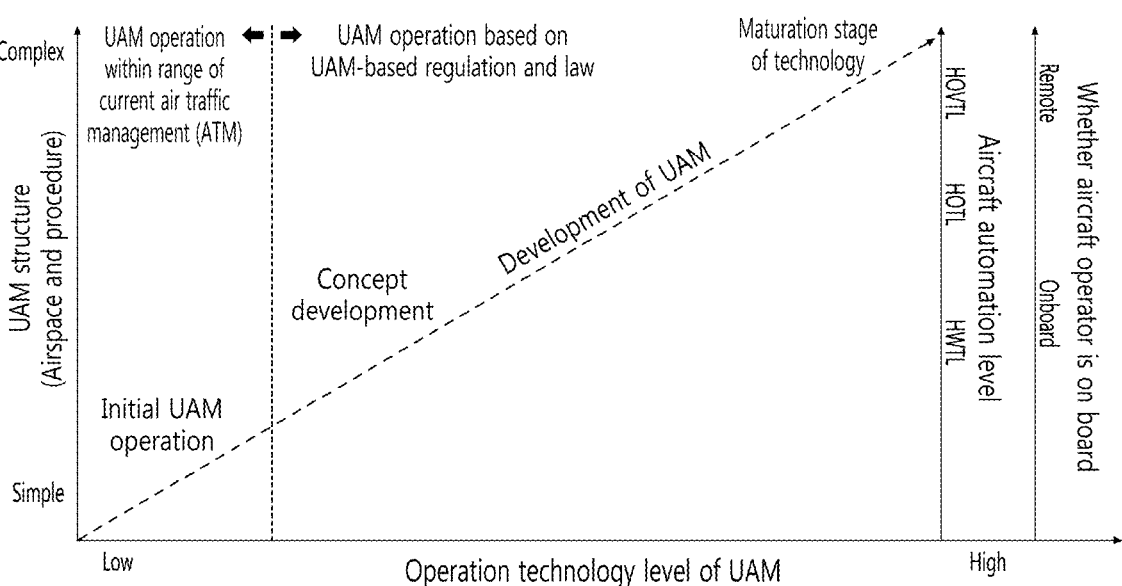
FIG. 7 is a diagram illustrating a development stage of the UAM.

FIG. 7 is a diagram illustrating a development stage of an operating technology level of the UAM.

Hereinafter, concepts of an initial UAM operation stage, a transitional UAM operation stage, and a final UAM operation stage will be described with reference to the above-described key indicators and FIG. 7.

First, in the initial UAM operation stage, the structure of the UAM aerial vehicle is likely to use various existing vertical take-off and landing (VTOL) rotary-wing aircraft infrastructures.

The UAM's regulatory changes may be gradually implemented while complying with aviation regulations and the like under current laws and regulations. However, the UAM community rules (CBR) may not be separately defined.

The aircraft automation level borrows manned rotary-wing technology, which is currently widely used as of the time this specification is written, but an on-board status may be applied to the pilot in command (PIC) stage.

Next, looking at the transitional UAM operation step, in the UAM structure, the UAM airframe may be operated within a specific airspace based on the performance and requirements of the UAM aerial vehicle.

As for UAM regulations, the ATM regulations may be changed and applied, new regulations for UAM that can be operated may be defined, and the UAM community regulations may also be defined.

In the transitional UAM operation stage, the automation level of the UAM aerial vehicle may be capable of PIC control with an airframe designed exclusively for the UAM, but the on-board status may still be maintained as the PIC stage.

Finally, looking at the final UAM operation stage, the UAM airframe may be operated in a specific airspace based on the performance and requirements of the UAM aerial vehicle, but several variables may exist.

It is predicted that the UAM regulation changes will require additional regulations to enable various operations within the UAM flight corridor, and as the complexity of the UAM community regulations increases, FAA guidelines are expected to increase.

Due to the development of artificial intelligence (AI) technology and the development of aviation airframe technology, the aircraft automation level will be realized at a higher automation level compared to the UAM aerial vehicle at the existing stage. As a result, it is predicted that it will reach the unmanned horizontal or vertical take-off or landing technology level, and the PIC stage may be a stage where remote control is possible.

Figure 8:
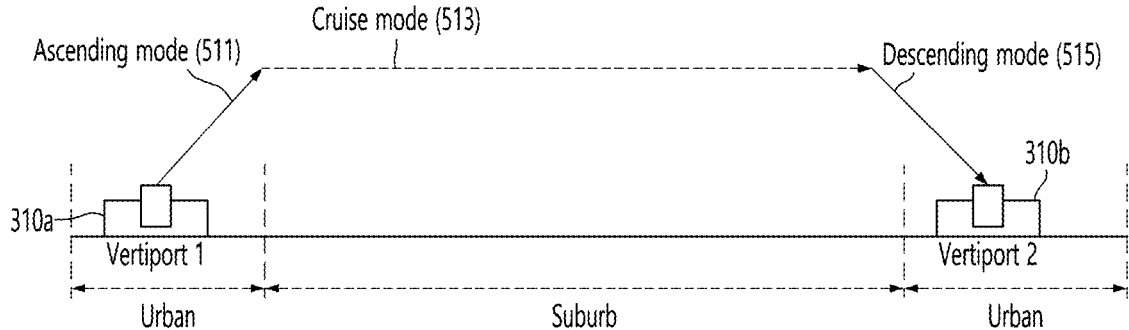
FIG. 8 is a diagram illustrating a flight mode of aerial vehicle according to an exemplary embodiment of the present disclosure.

FIG. 8 is a diagram for describing a flight mode of the UAM aerial vehicle according to an exemplary embodiment of the present disclosure.

Referring to FIG. 8, in an embodiment of the present disclosure, the flight mode of the UAM aerial vehicle may include a take-off mode (not illustrated), an ascending mode 511, a cruise mode 513, a descending mode 515, and a landing mode (not illustrated).

The take-off mode is a mode in which the UAM aerial vehicle takes off from a vertiport 310a at the starting point, the ascending mode 511 is a mode in which the UAM aerial vehicle performs a stage of ascending the flight altitude step by step to enter the cruise altitude, the cruise mode 513 is a mode in which the UAM aerial vehicle flies along the cruise altitude, the descending mode 515 is a mode in which the UAM aerial vehicle performs a stage of descending the altitude step by step in order to land from the cruise altitude to the vertiport 310b of the destination, and the landing stage is a mode in which the UAM aerial vehicle lands on the vertiport 310b of the destination.

In addition, in the take-off mode, the UAM aerial vehicle may perform a taxiing stage to enter the vertiport 310a of the departure point, and even after the landing stage, the UAM aerial vehicle may perform the taxiing stage to enter the vertiport 310b of the destination.

In another embodiment of the present embodiment, in the case of the vertical take-off and landing (VTOL), a take-off mode and the ascending mode 511 may be performed simultaneously, and a landing mode and descending mode 515 may also be performed simultaneously.

In this embodiment, the UAM aerial vehicle is a type of urban transport air transportation means, and the vertiport 310a of the departure point and the vertiport 310b of the destination may be located in the urban area, and according to the cruise mode 513, the aviation corridor on which the UAM aerial vehicle flies may be located in the suburban area outside the urban area.

According to the above-described embodiment of the present disclosure, the take-off mode, the ascending mode 511, the descending mode 515, and the landing mode of the UAM aerial vehicle are performed in a densely populated urban area so thrust may be generated through a distributed electric propulsion (DEP) method to suppress the generation of soot and noise caused by an internal combustion engine.

On the other hand, in the cruise mode 513 of the UAM aerial vehicle, which is mainly performed in the suburban area, the thrust may be generated by an internal combustion engine (ICE) propulsion method in order to increase an operating range, a payload, a flying time, etc.

Of course, the propulsion method for generating the thrust of the UAM aerial vehicle is not necessarily determined for each flight mode described above, and the thrust of the UAM aerial vehicle may be selected by either the DEP method or the ICE method by additionally considering various factors such as the location, altitude, speed, status, and weight of the UAM aerial vehicle.

The operation of the propulsion system according to the flight area of the UAM aerial vehicle according to the embodiment of the present disclosure illustrated in FIG. 8 is summarized in <Table 2> below.

TABLE 2

| Flight Area | Description of propulsion system operation - control |
|---|---|
| Urban | Generate lift and thrust only with battery, not internal combustion engines, in consideration of low noise and eco-friendliness |
| | Flight by selecting propulsion unit that may generate thrust/lift as much as data trained in advance through machine learning (ML) rather than full propulsion system, and generating lift/thrust with only selected propulsion unit |
| Suburb | In suburban area, which is less sensitive to noise and eco-friendliness than in urban area, thrust is generated through all propulsion units to enable full power flight for cruise flight, and power is supplied through battery or internal combustion engine |

In the flight stage including the above-described take-off stage, ascending stage, cruise stage, descending stage, and landing stage, the aerial vehicle may be exposed to various dangerous objects such as wires, birds, and buildings. Hereinafter, a method of detecting a dangerous object according to an embodiment of the present disclosure will be described in more detail.

Figure 9:
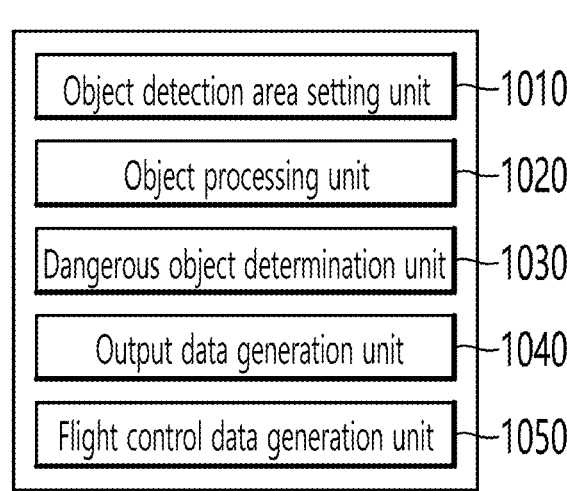
FIG. 9 is a diagram illustrating a component of an apparatus for detecting a dangerous object for an aerial vehicle according to an embodiment of the present disclosure.

FIG. 9 is a diagram illustrating a component of an apparatus for detecting a dangerous object for an aerial vehicle according to an embodiment of the present disclosure. Referring to FIG. 9, an apparatus 1000 for detecting an object for an aerial vehicle may include all or part of an object detection area setting unit 1010, an object processing unit 1020, a dangerous object determination unit 1030, an output data generation unit 1040, and a flight control data generation unit 1050.

Here, the dangerous object may mean an object that may be dangerous during the flight of the aerial vehicle, such as an object with a risk of collision during the flight of the aerial vehicle or an object located in a flight direction of the aerial vehicle.

The dangerous object determination unit 1030, which will be described later, may analyze and determine a degree of risk based on the detailed object information generated by the object processing unit 1020. For example, the dangerous object determination unit 1030 may determine that high-rise buildings, other aerial vehicles, bird flocks, etc., which are a type of objects that may be dangerous to the flight of the aerial vehicle among various types of objects detected by the object processing unit 1020, are dangerous objects.

The object detection area setting unit 1010 may set an object detection area in the air in which aerial vehicle is flying by using a plurality of sensors. Here, the plurality of sensors may include at least one or more sensors.

For example, the first sensor may be a radio detection and ranging (Radar) sensor, the second sensor may be a light detection and ranging (Lidar) sensor, and the third sensor may be a camera sensor.

The radar sensor may transmit radio waves and receive radio waves returned after the transmitted signals are reflected from various objects around the aerial vehicle. The radar sensor may generate 2-dimensional (2D) point cloud data based on the received radio waves.

The Lidar sensor may transmit laser and receive the laser that returns after the transmitted laser is reflected from various objects around the aerial vehicle. The Lidar sensor may generate 3-dimensional (3D) point cloud data based on the received laser.

The camera sensor may generate an image by capturing the surroundings of the aerial vehicle.

Figure 10:
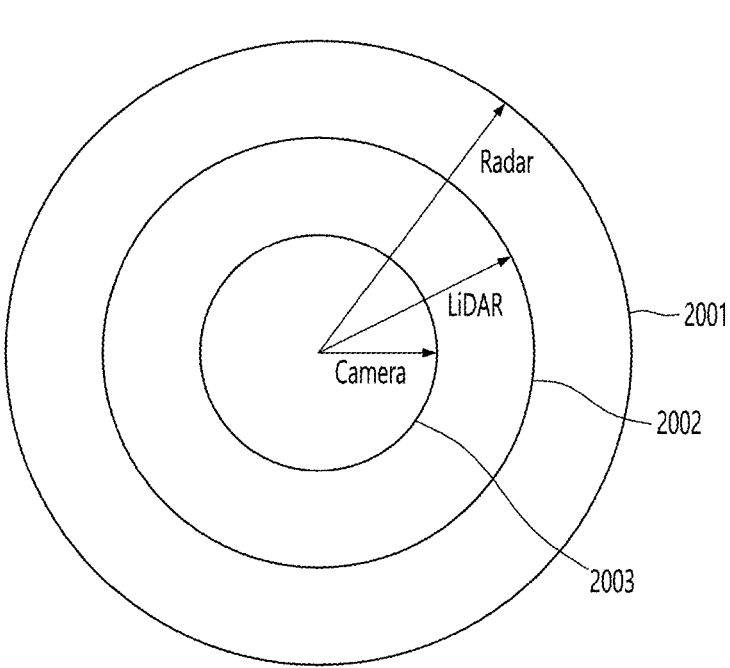
FIG. 10 is a diagram illustrating detection areas for each sensor according to an embodiment of the present disclosure.

FIG. 10 is a diagram illustrating a detection area for each sensor according to an embodiment of the present disclosure. Referring to FIG. 10, an object detection area in the air generated using the plurality of sensors described above may include a first area 2001 formed by a radar sensor, a second area 2002 formed by the Lidar sensor, and a third area 2003 formed by the camera sensor.

In this case, the first area 2001 formed by the radar sensor may have a greater coverage than the second area 2002 formed by the Lidar sensor and the third area 2003 formed by the camera sensor.

In addition, the second area 2002 formed by the Lidar sensor may be an area having a greater coverage than the third area 2003 formed by the camera sensor.

Meanwhile, the object processing unit 1020 may detect an object in the object detection area set by the object detection area setting unit 1010 and calculate the detailed object information on the detected object.

Specifically, the object processing unit 1020 may acquire radar sensor data, Lidar sensor data, and camera sensor data detected by each of the radar sensor, Lidar sensor, and camera sensor. For example, the object processing unit 1020 may acquire the radar sensor data for the area between the first area 2001 and the second area 2002 set by the object detection area setting unit 1010. As another example, for the area between the second area 2002 and the third area 2003 set by the object detection area setting unit 1010, the object processing unit 1020 may acquire the radar sensor data and the Lidar sensor data. As another example, for the third area 2003 set by the object detection area setting unit 1010, the object processing unit 1020 may acquire the radar sensor data, the Lidar sensor data, and the camera sensor data.

Here, the radar sensor data may include 2D point cloud data detected by the radar sensor, the lidar sensor data may include 3D point cloud data detected by the Lidar sensor, and the camera sensor data may include an image captured by the camera.

In addition, the object processing unit 1020 may use at least one of the radar sensor data, the Lidar sensor data, and the camera sensor data acquired according to the above-described object detection areas 2001, 2002, and 2003 to detect objects in the object detection areas 2001, 2002, and 2003 and generate the detailed object information on the detected object.

In this case, the object processing unit 1020 may use only the radar sensor data or fuse at least two of the radar sensor data, the Lidar sensor data, and the camera sensor data according to the object detection areas 2001, 2002, and 2003 to generate the detailed object information.

Here, the detailed object information may include coordinate position, kinematic information, geometric information, and semantic information on an object.

In addition, the detailed object information may further include at least one of the type of object, the flight direction of the object, the flight speed of the object, the distance between the object and the aerial vehicle, and the time to collision between the object and the aerial vehicle calculated based on the above-described coordinate position, kinematic information, geometric information, and semantic information of the object.

Meanwhile, the dangerous object determination unit 1030 may determine whether the detected object is the dangerous object based on the calculated detailed object information.

In addition, the output data generation unit 1040 may generate a guidance data for the dangerous object when the dangerous object is determined by the dangerous object determination unit 1030.

In addition, the flight control data generation unit 1050 may generate a control data that controls the flight of the aerial vehicle to avoid the dangerous object when the dangerous object is determined by the dangerous object determination unit 1030.

Figure 11:
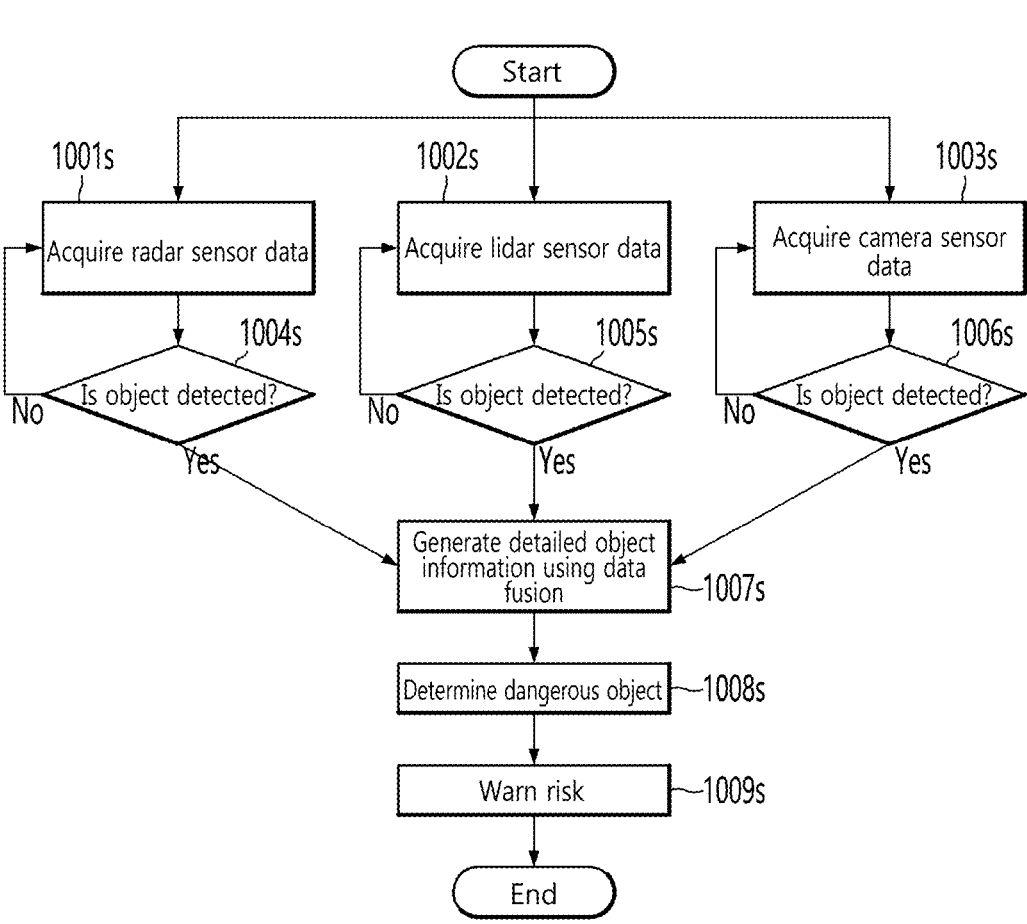
FIG. 11 is a diagram illustrating a method of detecting a dangerous object according to an embodiment of the present disclosure.

FIG. 11 is a diagram illustrating a method of detecting a dangerous object according to an embodiment of the present disclosure. Referring to FIG. 11, the object processing unit 1020 may acquire the radar sensor data detected by the radar sensor (1001S), acquire the Lidar sensor data detected by the Lidar sensor (1002S), and acquire the image captured by the camera sensor (1003S). Here, the data acquired in the acquisition steps (1001S, 1002S, and 1003S) may vary depending on the object detection areas 2001, 2002, and 2003 described above.

In addition, the object processing unit 1020 may perform detecting the object using the acquired data (1004s, 1005s, 1006s).

Specifically, the object detection step (1004s) of the object processing unit 1020 may include detecting 2D point cloud data corresponding to the object from the 2D point cloud data included in the radar sensor data. When an object is not detected (1004s: N), the object processing unit 1020 may repeatedly perform continuously acquiring the radar sensor data (1001s). However, when an object is detected (1004s: Y), a fusion step (1007s) to be described later may be performed.

In addition, the object detection step (1005s) of the object processing unit 1020 may include detecting 3D point cloud data corresponding to the object from the 3D point cloud data included in the Lidar sensor data. When an object is not detected (1005s: N), the object processing unit 1020 may repeatedly perform continuously acquiring the Lidar sensor data (1002s). However, when an object is detected (1005s: Y), the fusion step (1007s) to be described later may be performed.

Also, the object detection step (1006s) of the object processing unit 1020 may include detecting an image corresponding to an object from an image included in camera sensor data. When an object is not detected (1006s: N), the object processing unit 1020 may repeatedly perform continuously acquiring the captured data (1003s). However, when an object is detected (1006s: Y), the fusion step (1007s) to be described later may be performed.

Meanwhile, when an object is detected, the object processing unit 1020 may generate detailed object information using fusion data (1007s).

For example, when an object is located between the first area 2001 and the second area 2002 set by the object detection area setting unit 1010, the object processing unit 1020 may acquire only the radar sensor data, and the object processing unit 1020 may generate the detailed object information using only the radar sensor data.

As another example, when an object is located between the second area 2002 and the third area 2003 set by the object detection area setting unit 1010, the object processing unit 1020 may acquire the radar sensor data and Lidar sensor data, and the object processing unit 1020 may generate the detailed object information using the fusion data obtained by fusing the radar sensor data and the Lidar sensor data.

As another example, when an object is located in the third area 2003 set by the object detection area setting unit 1010, the object processing unit 1020 may use fusion data obtained by fusing the radar sensor data, the Lidar sensor data, and the camera sensor data to generate the detailed object information.

The sensing data fusion process by the object processing unit 1020 will be described later with reference to FIG. 12.

Figure 12:
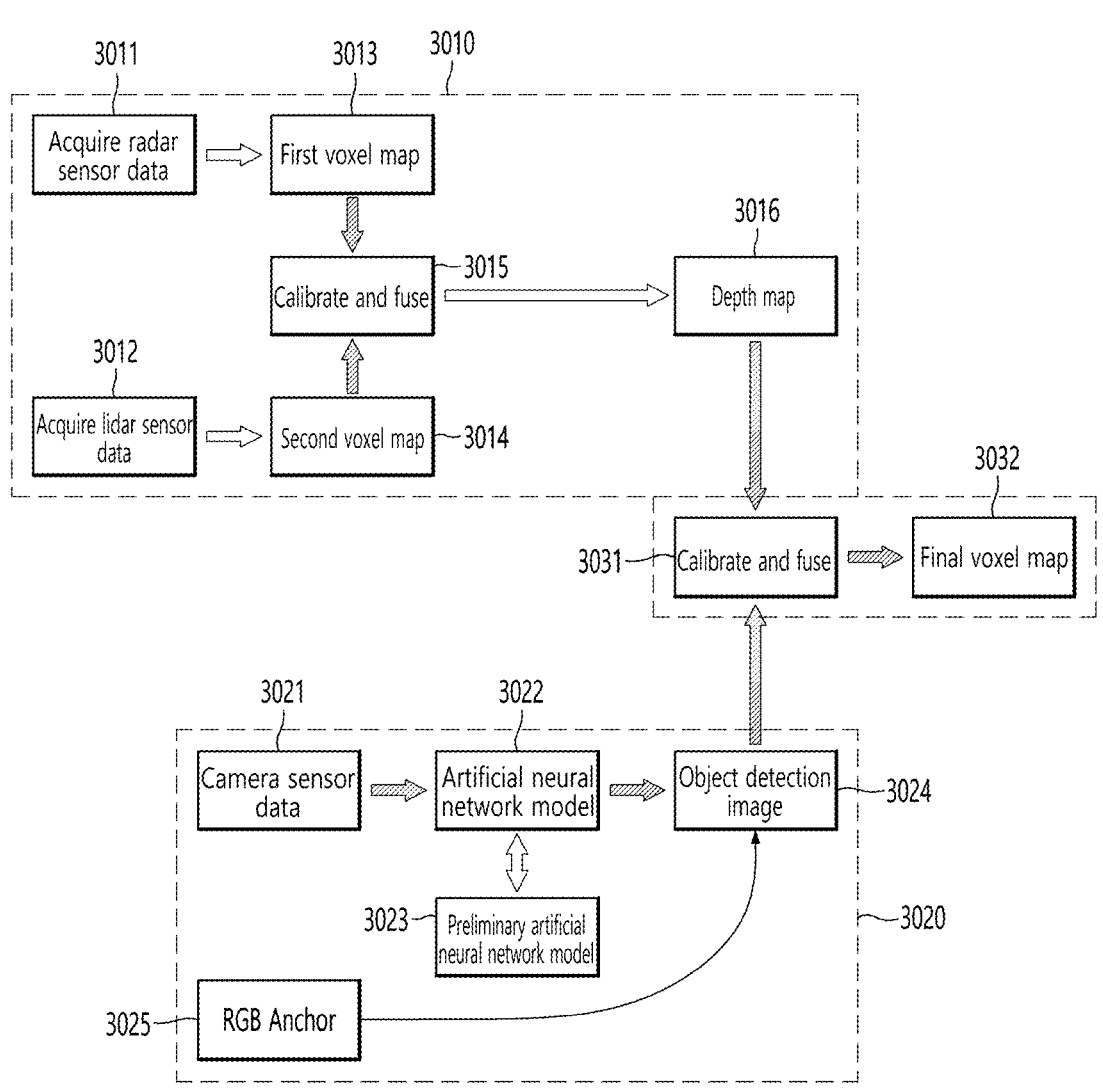
FIG. 12 is a diagram for describing in more detail a sensor data fusion process according to an embodiment of the present disclosure.

FIG. 12 is a diagram for describing in more detail a sensing data fusion process according to an embodiment of the present disclosure. FIG. 12 is a diagram illustrating a fusion process when an object is located in the third area 2003 set by the object detection area setting unit 1010. The fusion process includes a process of fusing the radar sensor data and the Lidar sensor data to generate first fusion data (3010), a process of processing the camera sensor data (3020), and a process of fusing the first fusion data and the processed camera sensor data to generate final fusion data (3030).

Prior to describing FIG. 12, the case where an object is located between the first area 2001 and the second area 2002 set by the object detection area setting unit 1010 and the case where an object is located between the second area 2002 and the third area 2003 set by the object detection area setting unit 1010 will be described first.

[When Object is Located Between First Area 2001 and Second Area 2002]

The object processing unit 1020 may generate the detailed object information using the radar sensor data. Specifically, the object processing unit 1020 may generate a first voxel map 3013 using the point cloud data included in the radar sensor data, and generate the detailed object information based on the generated first voxel map 3013.

[when Object is Located Between Second Area 2002 and Third Area 2003]

When an object is located between the second area 2002 and the third area 2003 set by the object detection area setting unit 1010, the object processing unit 1020 may use the radar sensor data and the Lidar sensor data to generate the detailed object information. The object processing unit 1020 may generate the first voxel map 3013 using the point cloud data included in the radar sensor data 3011, and generate a second voxel map 3014 using the point cloud data included in the Lidar sensor data 3012.

Here, the voxel maps 3013 and 3014 generated by the object processing unit 1020 may include at least one voxel. Further, each voxel may include at least one piece of point data, or voxels that do not include point data may also exist.

In addition, at least one of the number of points and a voxel number may be stored as an attribute value in each voxel constituting the voxel maps 3013 and 3014.

In addition, the object processing unit 1020 may generate a depth map 3016 by calibrating and fusing (3015) the generated first voxel map 3013 and the second voxel map 3014. The object processing unit 1020 may generate the detailed object information based on the generated depth map.

Here, the calibration and fusion process (3015) of the object processing unit 1020 may include a process of determining isolated points that do not match each other between the first voxel map 3013 and the second voxel map 3014 as outlier points and removing the outlier points.

Meanwhile, the detailed object information that the object processing unit 1020 may generate using the radar sensor data and the Lidar sensor data may be as shown in Table 3 below. According to a non-limiting embodiment of the present disclosure, the object processing unit 1020 may detect point cloud data corresponding to objects including other aerial vehicles, bird flocks, buildings, etc., in the first voxel map 3013 generated based on the above-described radar sensor data or detect point cloud data corresponding to objects including other aerial vehicles, bird flocks, buildings, etc., from the depth map 3016 generated based on the above-described radar sensor data and Lidar sensor data, thereby generating the detailed object information in Table 3 below corresponding to the detected object.

TABLE 3

| | Lidar | Radar | Lidar + Radar |
|---|---|---|---|
| Coordinate position | O (3 D location) | O (2 D location) | O |
| Kinematic information | X | O | O |
| Geometric information | O | Δ | O |
| Semantic information | Δ (if Lidar perceives) | X | Δ (if Lidar perceives) |

Here, the coordinate position is information indicating a location of an object, and may be, for example, a coordinate value indicating a location of an object in 2 dimension or 3 dimension.

Also, the kinematic information may include at least one of acceleration, velocity, and displacement of an object.

Also, the geometric information may include at least one of a size of an object and the number of points.

Also, the semantic information may include a type of object. The type of object may mean a logical classification of objects such as buildings, roads, aerial vehicles, bird flocks, and the like.

That is, referring to Table 3, the object processing unit 1020 may acquire the coordinate position (3D coordinate position) and geometric information of the object using the Lidar sensor data, and may acquire or may not acquire the semantic information according to the Lidar operation. Accordingly, when an object is located between the first area 2001 and the second area 2002 set by the object detection area setting unit 1010, the object processing unit 1020 may generate the detailed object information including the coordinate position, the kinematic information, and the geometric information (whether it is acquired is different on a case-by-case basis) for an object using only the radar sensor data.

In addition, referring to Table 3, the object processing unit 1020 may acquire the coordinate position (2D coordinate position) and kinematic information of the object using the radar sensor data, and may acquire or may not acquire the geometric information according to the radar operation. Accordingly, when an object is located between the second area 2002 and the third area 2003 set by the object detection area setting unit 1010, the object processing unit 1020 may fuse the radar sensor data and the Lidar sensor data to generate the detailed object information including the coordinate position, the kinematic information, the geometric information, and the semantic information (whether it is acquired is different on a case-by-case basis).

[when Object is Located in Third Area 2003]

Meanwhile, referring back to FIG. 10, when an object is located in the third area 2003 set by the object detection area setting unit 1010, the object processing unit 1020 may use the radar sensor data, the Lidar sensor data, and the camera sensor data to generate the detailed object information.

The object processing unit 1020 may generate the depth map 3016 using the radar sensor data and the Lidar sensor data, and since this has been described above, a detailed description thereof will be omitted.

Describing the process of processing the camera sensor data processing process (3020) of the object processing unit 1020 in more detail, the object processing unit 1020 may input the image included in the camera sensor data 3021 to the artificial neural network model 3022 to detect an object (3024).

Here, the artificial neural network model is a model trained to detect an object from an image, and the artificial neural network model 3022 may receive an image in units of frames and generate a bounding box indicating an area of an object in the image and information on a type of object corresponding to the bounding box. For example, according to a non-limiting embodiment of the present disclosure, an object recognition model based on a convolution neural network (CNN) may be used as an artificial neural network model.

In addition, when the precise detection is required depending on the size and operational speed of the aerial vehicle, a preliminary artificial neural network model 3023 may be added to the artificial neural network model so that a deep learning model with a deeper layer may be selected. Here, the preliminary artificial neural network model may be implemented as a Bi-directional feature pyramid network (BiFPN) to effectively detect objects of various sizes.

In addition, the object processing unit 1020 may be implemented to trade off speed-accuracy by clipping the size of the network according to the required performance.

Meanwhile, when the object detection image 3024 is generated according to the process of processing the camera sensor data (3020) of the object processing unit 1020, the object processing unit 1020 may perform the final fusing process 3030 that fuses the depth map 3016 and the object detection image 3024.

Here, in the final fusion process 3030, a final voxel map 3032 may be generated by calibrating and fusing (3031) the depth map 3016 and the object detection image 3024.

In this case, the detailed object information may be assign to each of the objects included in the final voxel map 3032.

The process 3030 of generating the final fusion data will be described in more detail with reference to FIG. 13.

Figure 13:
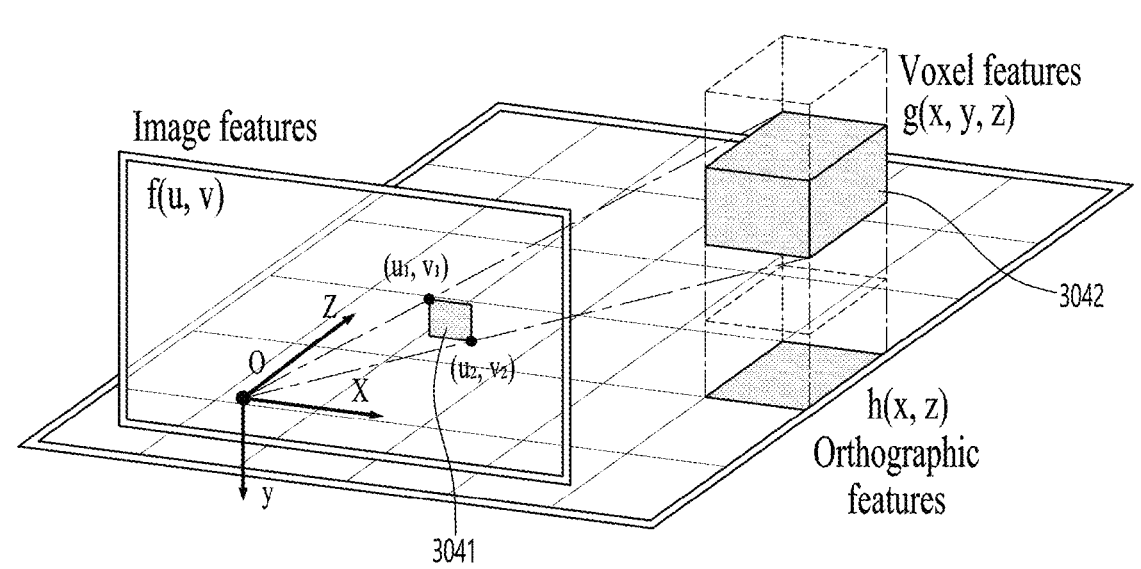
FIGS. 13 to 14 is a diagram illustrating a process of projecting detection elements of a depth map onto an image according to an embodiment of the present disclosure.

FIG. 13 is a diagram illustrating a process of projecting detection elements of the depth map 3016 onto the image 3024 according to an embodiment of the present disclosure. Referring to FIG. 13, the object processing unit 1020 may match a bounding box 3041 according to the object detection in the image 3024 included in the camera sensor data and a box 3042 according to the object detection in the depth map 3016.

For example, the object processing unit 1020 may match the bounding box 3041 and the box 3042 with a Global Nearest Neighbor (GNN) algorithm, and then compare the bounding box 3041 and the box 3042 with a projected box projected onto a plane of the image 3024 to calculate a shape error, and match with the same object when the calculated shape error is less than a threshold.

Figure 14:
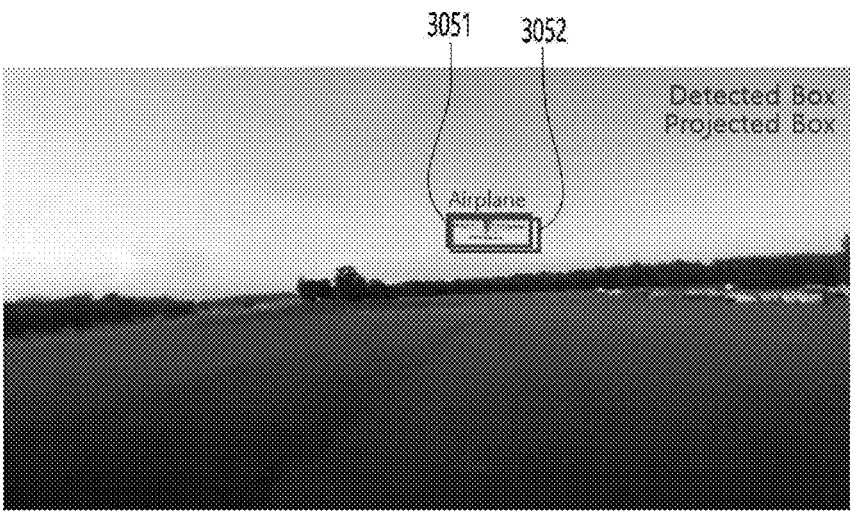

Describing this in more detail with reference to FIG. 14, the object processing unit 1020 may compare bounding box (detected box) 3051 corresponding to the aerial vehicle detected in the image 3024 with a projected box 3052 projected onto the plane of the image 3024 to determine whether the object is the same.

When it is determined as a result of the above determination that the object is the same, the object processing unit 1020 may assign the type of object acquired from the object detection image 3024 to an attribute value of the object included in the depth map 3016. However, when detected in the depth map 3016 but not detected in the image 3024, the object processing unit 1020 may assign an unknown obstacle value to the type of object.

Finally, the object processing unit 1020 may fuse the radar sensor data, the Lidar sensor data, and the camera sensor data to generate the final voxel map 3032 to which the detailed object information including the coordinate position, the kinematic information, the geometric information, and the semantic information is assigned.

In addition, the object processing unit 1020 may calculate at least one of object type information, flight direction information of an object, flight speed information of an object, distance information between an object and aerial vehicle, and information on the time to collision between the object and the aerial vehicle based on at least one of the above-described coordinate position, kinematic information, geometric information, and semantic information of the object.

For example, the object processing unit 1020 may calculate the object type information using the semantic information on an object. As another example, the object processing unit 1020 may calculate the flight speed information of the object and the flight direction information of the object using the kinematic information of the object. As another example, the object processing unit 1020 may calculate the distance information between the object and the aerial vehicle using the coordinate position of the object. As another example, the object processing unit 1020 may calculate the information on the time to collision between the object and the aerial vehicle using the coordinate position and kinematic information of the object.

The detailed object information according to the present disclosure may be implemented to further include at least one of the object type information, the flight direction information of the object, the flight speed information of the object, the distance information between the object and the aerial vehicle, and the information on the time to collision between the object and the aerial vehicle.

Referring back to FIG. 11, the dangerous object determination unit 1030 may determine a dangerous object among the detected objects based on the detailed object information generated by the object processing unit 1020 (1008s).

For example, the dangerous object determination unit 1030 may determine, as the dangerous objects, high-rise buildings, other aerial vehicles, bird flocks, etc., which are types of objects that may be dangerous to the flight of the aerial vehicle among various detected type of objects by considering only the object type information which is a single variable.

As another example, the dangerous object determination unit 1030 may determine, as the dangerous object, the object located in the flight direction of the aerial vehicle among high-rise buildings, other aerial vehicles, bird flocks, and the like which are types of objects that may be dangerous to flight, by considering the object type information and the object flight direction information.

As another example, the dangerous object determination unit 1030 may determine the object located in the flight direction of the aerial vehicle as the dangerous object by considering at least one of the coordinate position of the object and the flight direction information of the object.

As another example, the dangerous object determination unit 1030 may determine, as the dangerous object, at least one of an object whose distance from the aerial vehicle is less than a predetermined distance and an object whose time to collision with the aerial vehicle is less than a predetermined time by considering at least one of the distance information between the object and the aerial vehicle and the time to collision information between the object and the aerial vehicle.

Referring back to FIG. 11, when the dangerous object is determined by the dangerous object determination unit 1030, the output data generation unit 1040 may generate the guidance data for the dangerous object and may issue a warning to a user (1009s). Specifically, the output data generation unit 1040 may generate a display location, display form, etc., of guidance data for guiding a dangerous object using the final voxel map 3032 generated according to the above-described fusion operation. In this case, the generated guidance data may be displayable data in at least one of an augmented reality (AR) display mode, a vector map display mode, and a raw data display mode.

Meanwhile, the guidance data for the dangerous object generated by the output data generation unit 1040 may be transmitted to a display device (not illustrated) displaying a screen, and the display device may use the guidance data to display at least one of the augment reality (AR) screen, a vector map screen, and a raw data screen.

In this regard, as an example, the guidance data displayed through an augmented reality screen may be as shown in FIGS. 16 to 21.

Meanwhile, although not illustrated in FIG. 11, when the dangerous object is determined by the dangerous object determination unit 1030, the flight control data generation unit 1050 may generate a control data that controls the flight of the aerial vehicle to avoid the dangerous object. In addition, the flight control data generated by the flight control data generation unit 1050 may be transmitted to a flight control device (not illustrated) that controls at least one of autonomous flight and manned flight of the aerial vehicle, and the flight control device (not illustrated) may control the flight of the aerial vehicle to avoid a dangerous object using flight control data.

Also, although not illustrated in FIG. 11, when the dangerous object is determined by the dangerous object determination unit 1030, the map data updating unit (not illustrated) may add the dangerous object to a volatile (non-fixed) map layer.

Figure 15:
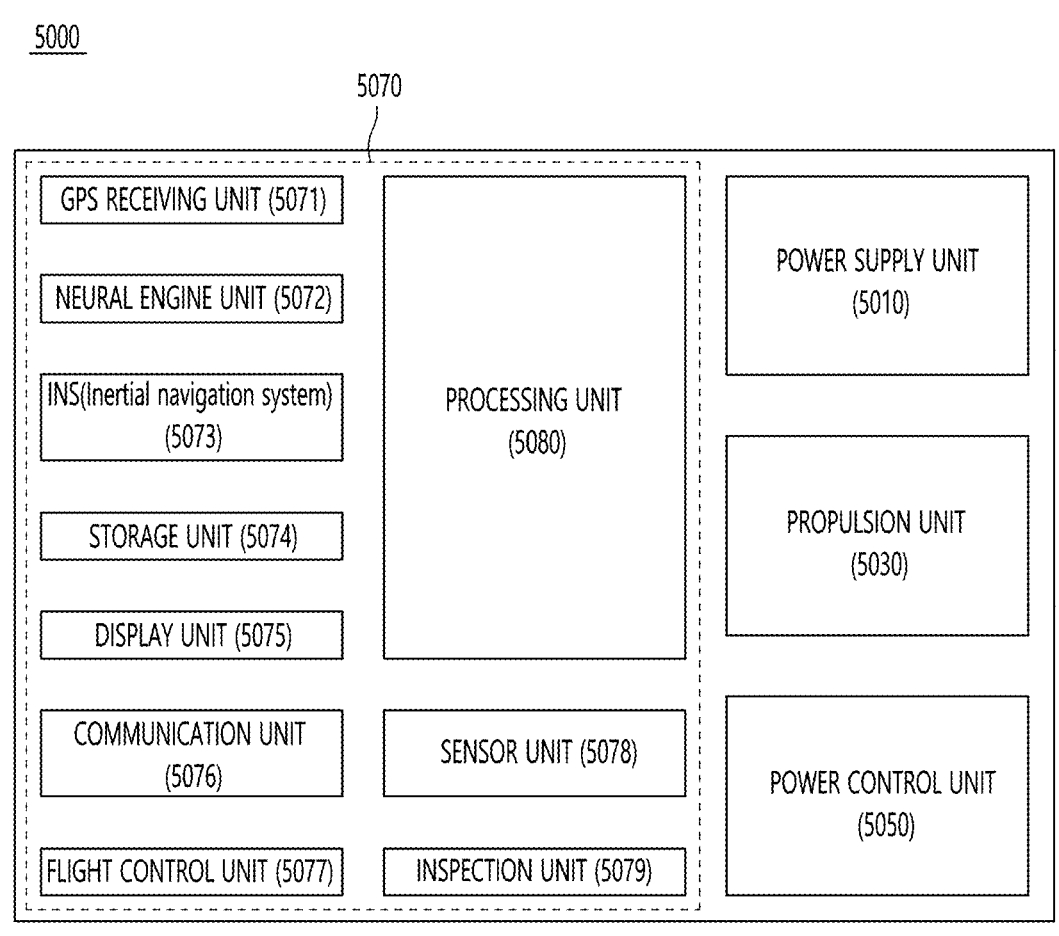
FIG. 15 is a block diagram illustrating a UAM aerial vehicle according to an embodiment of the present disclosure.

FIG. 15 is a block diagram illustrating aerial vehicle according to an embodiment of the present disclosure. Referring to FIG. 15, a UAM aerial vehicle 5000 may include a power supply unit 5010, a propulsion unit 5030, a power control unit 5050, and a flight control system 5070.

The UAM aerial vehicle 5000 of this embodiment may include a propulsion unit 5030 including a plurality of propulsion units, and a fan module including an electric fan motor and a propeller may be applied as an embodiment of the plurality of propulsion units.

The fan module may receive power through the power supply unit 5010, and control of each of the plurality of fan modules may be performed through the power control unit 5050.

Also, the power supply unit 5010 may selectively provide any one of power generated through an internal combustion engine and power generated through electric energy to the plurality of fan modules. More specifically, the power supply unit 5010 may include a fuel storage unit, an internal combustion engine, a generation, and a battery unit. The fuel storage unit may store fuel required for the operation of the aerial vehicle.

The fuel required for the operation of an aerial vehicle may include taxi fuel required for taxiing on the ground, trip fuel required for one-time landing approach and a missed approach by flying from a departure point to a destination, destination ALT fuel required to fly from the destination to the landing point in case of a nearby emergency, holding fuel required to stay in flight for a certain period of time with the expected weight of the aerial vehicle at the landing point of the destination, additional fuel in case more fuel is required due to a failure of engine, and pressurizer, etc., contingency fuel additionally loading a certain percentage of trip fuel to prepare for an emergency, etc.

The above-described type of fuel is one type for calculating fuel required for the operation of the aerial vehicle, and is not limited to the above-described type, and as will be described later, the amount of fuel stored in the fuel storage unit may be determined by considering the overall energy required for the operation of the aerial vehicle to reach the destination from the departure point together with the battery unit.

The internal combustion engine may generate power to drive a power generation unit by burning fuel stored in the fuel storage unit, and the power generation unit may generate electricity using power generated by the internal combustion engine and provide the power to the propulsion unit 5030.

The battery unit may be charged by receiving power from the power generation unit or by receiving power from the outside.

More specifically, fuel may be stored in the fuel storage unit and power may be supplied to the battery unit to be charged in consideration of total thrust energy required for the aerial vehicle to perform a mission.

However, when it is necessary to charge the battery unit according to the change in flight route due to the off-nominal situation, the battery unit may be charged through the power generation unit as described above.

The power control unit 5050 may include a power supply path control unit, a power management control unit, and a motor control unit, and may be controlled through the flight control system 5007.

Here, the flight control system 5070 may receive a pilot's control, a pre-programmed autopilot program, etc., through the control signal of the flight control surface, and control the attitude, route setting, output, etc., of the aerial vehicle.

In addition, the flight control system 5070 may process control and operation of various blocks constituting the UAM aerial vehicle.

The flight control system 5070 may include all or part of a processing unit 5080, a GPS receiving unit 5071, a neural engine 5072, an inertial navigation system 5073, a storage unit 5074, a display unit 5075, a communication unit 5076, a flight control unit 5077, a sensor unit 5078, and an inspection unit 5079.

The processing unit 5080 may process various information and data for the operation of the flight control system 5070 and control the overall operation of the flight control system 5070. In particular, the processing unit 5080 may perform the function of the above-described apparatus 1000 for detecting a dangerous object, and a detailed description thereof will be omitted.

The aerial vehicle may receive signals from GPS satellites through the GPS receiving unit 5071 to measure the location of the aerial vehicle.

The UAM aerial vehicle 5000 of this embodiment may receive information transmitted from control and base stations through the communication unit 5076. Examples of information transmitted from control and base stations may include weather information of a flight zone, no-fly zone information, flight information of other aerial vehicles, etc., and information directly or indirectly affecting the flight route among the information received through the communication unit 5076 may be output through the display unit 5075.

The UAM aerial vehicle 5000 may perform communication with an external control base or other aerial vehicle through the communication unit 5076. For example, the aerial vehicle may perform wireless communication with other UAM aerial vehicles, communication with the UAM operator 154 or the PSU 102, communication with a vertiport management system, and the like through the communication unit 5076.

The storage unit 5074 may store information such as various types of flight information related to the flight of the UAM aerial vehicle, flight plan, flight corridor information assigned from the PSU or UAM operator, track ID information, UAM flight data, and map data. Here, the flight information of the UAM aerial vehicle stored in the storage unit 5074 may exemplarily include coordinate position, altitude information, speed information, flight control surface control signal information, propulsion power control signal information, and the like of the aerial vehicle.

In addition, the storage unit 5074 may store a navigation map, traveling information, etc., necessary for the UAM aerial vehicle 5000 to travel from a departure point to a destination.

The neural engine 5072 may determine the failure or possibility of failure of each component of the UAM aerial vehicle 5000 through pre-trained data, and the training data may be accumulated through comparison with preset inspection results.

The inspection unit 5079 may compare an inspection result value obtained by inspecting the system of the UAM aerial vehicle 5000 with a preset result value. The above-described comparison may be performed sequentially while matching the components of the power unit and the control surface with the preset result value, and the process or result thereof may be identified to the pilot through the display unit 5000.

The sensor unit 5078 may include an external sensor module and an internal sensor module, and may measure the environment inside and outside the UAM aerial vehicle 5000. For example, the internal sensor module may measure the pressure, the amount of oxygen, etc., inside the UAM aerial vehicle 5000, and the external sensor module may measure the altitude of the UAM aerial vehicle 5000 and the existence of objects around the aerial vehicle, etc.

The inertial navigation system 5073 may use a gyro to create a reference table that maintains a constant attitude in an inertial space and is configured to include a precise accelerometer installed thereon, and may measure the current location of the aerial vehicle by obtaining the flight distance through the acceleration during the operation of the UAM aerial vehicle 5000.

The flight control unit 5077 may control the attitude and thrust of the UAM aerial vehicle 5000. More specifically, the flight control unit 5077 may receive the propulsion power control signal, the flight control surface control signal, etc., from the control surface, the UAM operator 154, the PSU 104, or the like, and control the flight force/control surface of the vehicle.

In addition, the flight control unit 5077 may control the operation of the power control unit 5050. Specifically, the power control unit 5050 may include a power supply path control unit, a power management control unit, and a motor control unit, and the power supply path control unit may select at least one of the power generation unit and the battery unit to supply power to at least one of the plurality of fan modules.

As an example of supplying power to a plurality of fan modules, the power supply path control unit may select at least one of the power generation unit or the battery unit as a power supply source based on the power required to generate the thrust of the aerial vehicle, and then may be controlled to have the same RPM through RPM monitoring of the fan/propeller of the propulsion unit for generating the thrust.

In this case, the power supply control unit may monitor the state of the selected propulsion unit, determine whether there is an inoperative propulsion unit when an error occurs in any one of the selected at least one propulsion unit, and supply power by selecting the inoperative propulsion unit as an alternative propulsion unit when there is an inoperative propulsion unit.

In addition, when there is no inoperative propulsion unit, the power supply path control unit 651 may determine whether insufficient propulsion power can be offset by increasing the RPM of the propulsion unit 631 in normal operation, and if the offset is possible, supplement the insufficient thrust by controlling the propulsion unit in the normal operation, and perform an emergency landing procedure if offset is not possible.

The power management control unit may calculate thrust, power, energy, etc. required for the aerial vehicle to perform a mission, and determine power required for the power generation unit and the battery unit based on the calculated thrust, power, energy, etc.

The motor control unit may control lift, thrust, etc., provided to the aerial vehicle by controlling the fan module.

Meanwhile, the display unit 5075 may display data generated by the output data generation unit 1040 of an apparatus 1000 for detecting a dangerous object. Hereinafter, a display of aerial vehicle output by the display unit 5075 according to an embodiment of the present disclosure will be described in more detail with reference to FIGS. 16 to 21.

Figure 16:
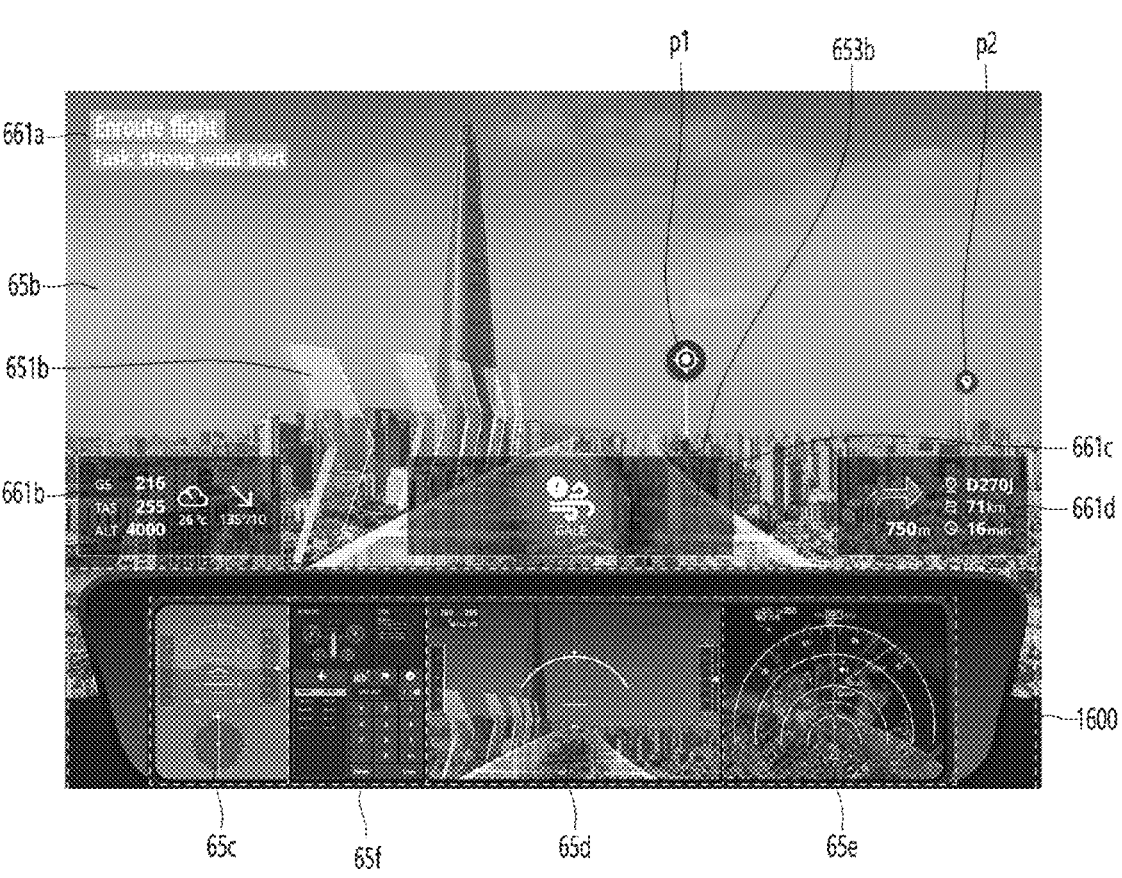
Figure 17:
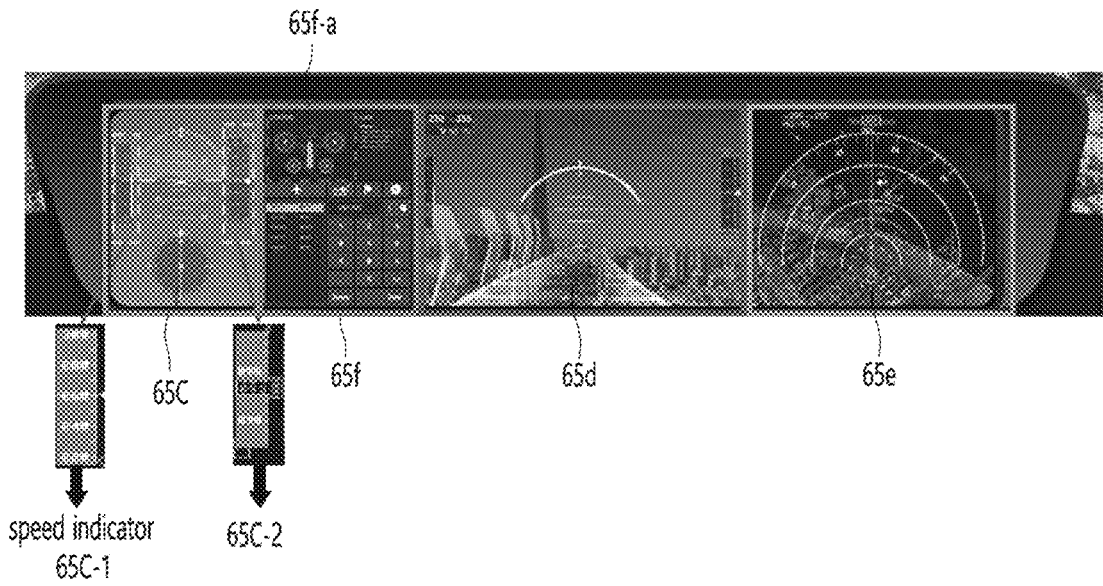

As illustrated in FIGS. 16 and 17, the display of the aerial vehicle may include a primary flight display 65b that is transmitted through the windshield of the UAM aerial vehicle and displays various types of information related to UAM flight to a pilot and/or passengers in the AR form, and a secondary flight display 1600 that displays various types of flight assist information necessary for the UAM flight to a UAM pilot on a plurality of displays.

The secondary flight display 1600 may be implemented in the form of a multi-function display (MFD). Referring to FIG. 17, the secondary flight display 1600 may include a flight direction display 65c, a UAM status indication display 65*f*, a UAM navigation display 65*d*, and a UAM surrounding environment information display 65*e*.

The flight direction display 65*c* may include a UAM electronic attitude direction indicator (EADI) including horizontal lines and vertical lines. The horizontal lines in the electronic attitude meter may provide the UMA pitch information, the vertical lines may provide the UAM roll information, and when both the UAM's pilot or UAM flight are in autopilot mode, the UAM's flight computer should generate various types of control information to perform the flight according to the provided information.

On the left side of the flight direction display 65*c*, a speed indicator 65*c*-1 displaying the current flight speed of the UAM may be displayed overlaid with EADI, and on the right side, a glide scope indicator 65*c*-2 may be displayed overlaid with the EADI.

The UAM status indicator display 65*f* may include a UAM propulsion unit status indicator 65*f*-*a*. Reference number 65*f*-*a* shows that the number of UAM propulsion units is four, but this only shows a current status of each propulsion unit in real time when the UAM is a quadcopter according to one embodiment, and it is natural that they are displayed differently depending on the number of propulsion units mounted on the UAM.

Meanwhile, the UAM navigation display 65*d* displays a navigation map according to a route pre-assigned to the UAM. In the present disclosure, the route, waypoint, etc., of the UAM are displayed in an AR method. Through the UAM navigation display 65*d*, the pilot and/or passengers of the UAM may intuitively know that the UAM is flying normally without deviating from a predetermined route.

The UAM surrounding environment information display 65*e* may display surrounding obstacles and/or surrounding terrain, etc., that are sensed through non-vision sensors mounted on the UAM, and even when visibility flight is difficult due to fog or the like, the information for assisting the safe flight of the UAM may be provided.

In addition, the primary flight display 65*b* may display a route guidance object 651*b* to a waypoint p1 or a vertiport p2 as well as the vertiport p2 and the waypoint p1.

In addition, the primary flight display 65*b* may display a UAM flight-related event guidance message 661*a*, UAM flight auxiliary information 661*b*, a UAM flight-related event guidance object 661*c*, and UAM flight route auxiliary information 661*d*. Here, the UAM flight-related event message 661*a* may include a notification of the current situation of the UAM aerial vehicle indicated by "flight" and the detected dangerous object indicated by "Task: building occurrence notification". In addition, the UAM flight assist information 661*b* may further include a ground speed (GS) indicated by "216", an altitude (ALT) indicated by "255", and a true airspeed (TAS) indicated by "4000", and further include temperature and weather and wind may direction and speed. In addition, the UAM flight route auxiliary information 661*d* may include a location of a destination indicated by "D270J", a distance to a destination indicated by "71 KM", an estimated time to a destination indicated by "16 min", a turn direction, and a distance to a turn point. In addition, the UAM flight-related event guidance object 661*c* may display an icon indicating the detected dangerous type of object.

Figure 18:
Figure 19:
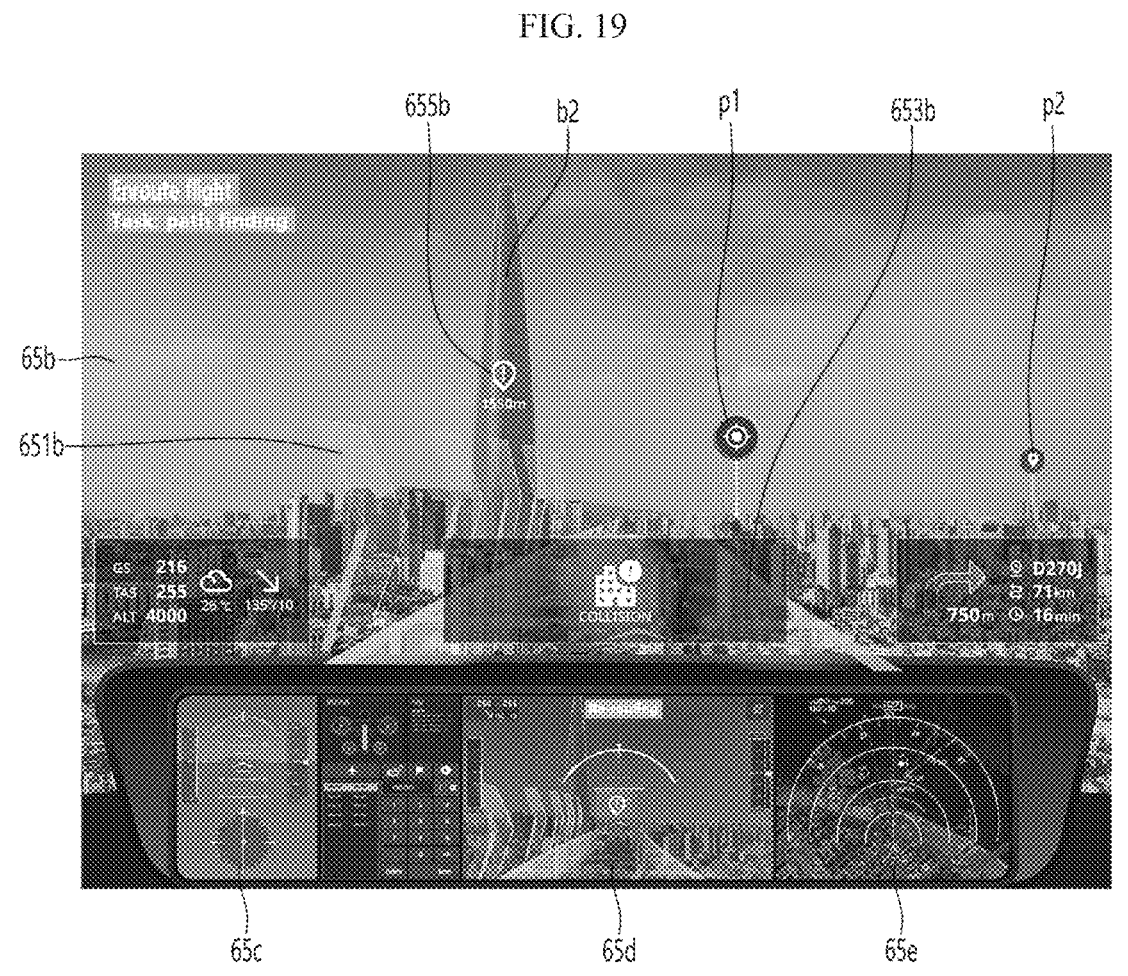

Meanwhile, FIGS. 18 and 19 illustrate Meanwhile, FIGS. 18 to 19 illustrates that a UAM flight-related event guidance object 653*b* displaying an icon corresponding to the building b2 detected as a dangerous object is displayed when the dangerous object determination unit 1030 detects the building b2 on the flight route as the dangerous object. In this case, the primary flight display 65*b* may display height information of the building b2 as the dangerous object or distance information to the building 655*b*. In addition, as the obstacle b2 is detected in the current flight route of the UAM, a flight caution event occurs, and therefore, the primary flight display 65*b* may change and display the color of the dangerous object that generates the event. In addition, as illustrated in FIG. 18, the primary flight display 65*b* may display the route guidance object 651*b* in different colors to intuitively deliver dangerous information to a pilot.

Further, the flight control data generation unit 1050 may generate a new route bypassing the point where the event occurred and then display the generated route through the primary flight display 65*b*. In this case, the route guidance object 651*b* may be displayed identically to the route guide object in the case where the existing aerial vehicle is in normal traveling.

Figure 20:
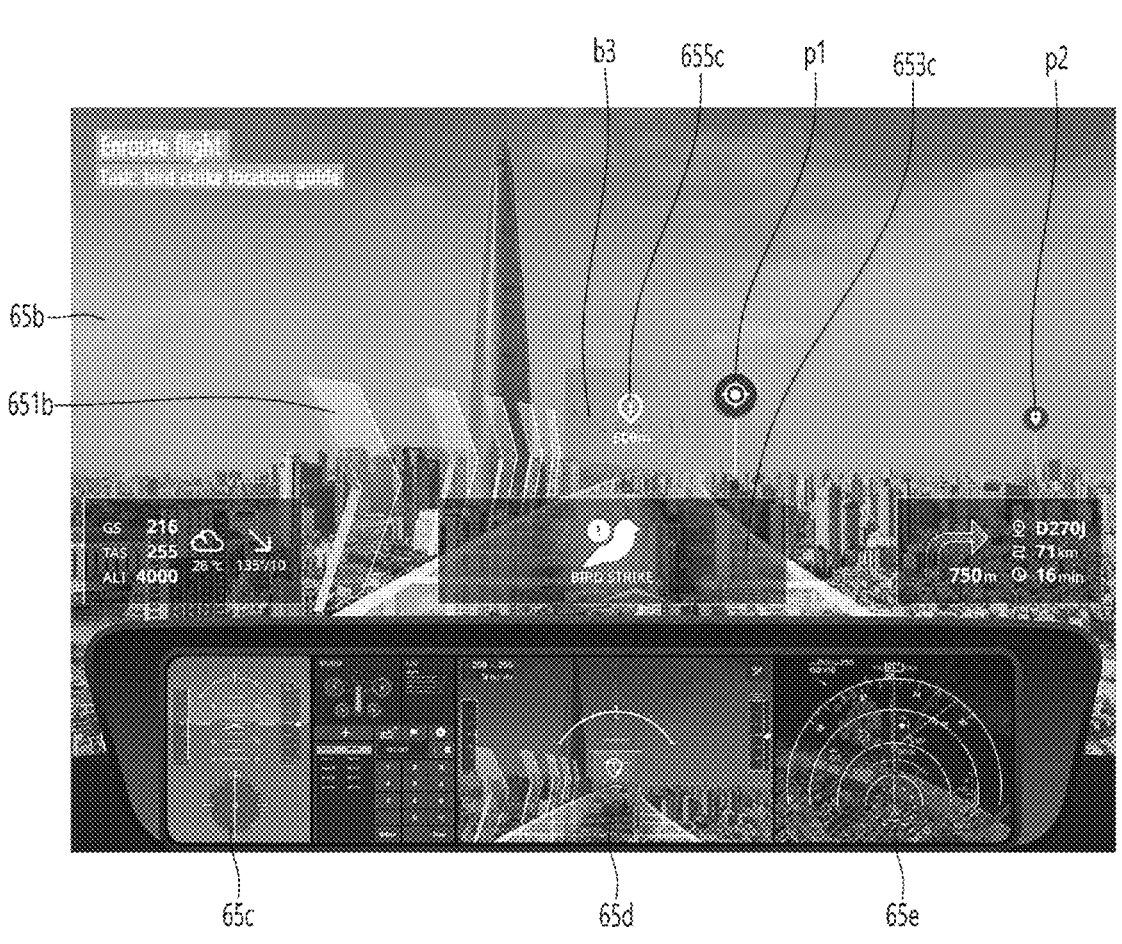
Figure 21:
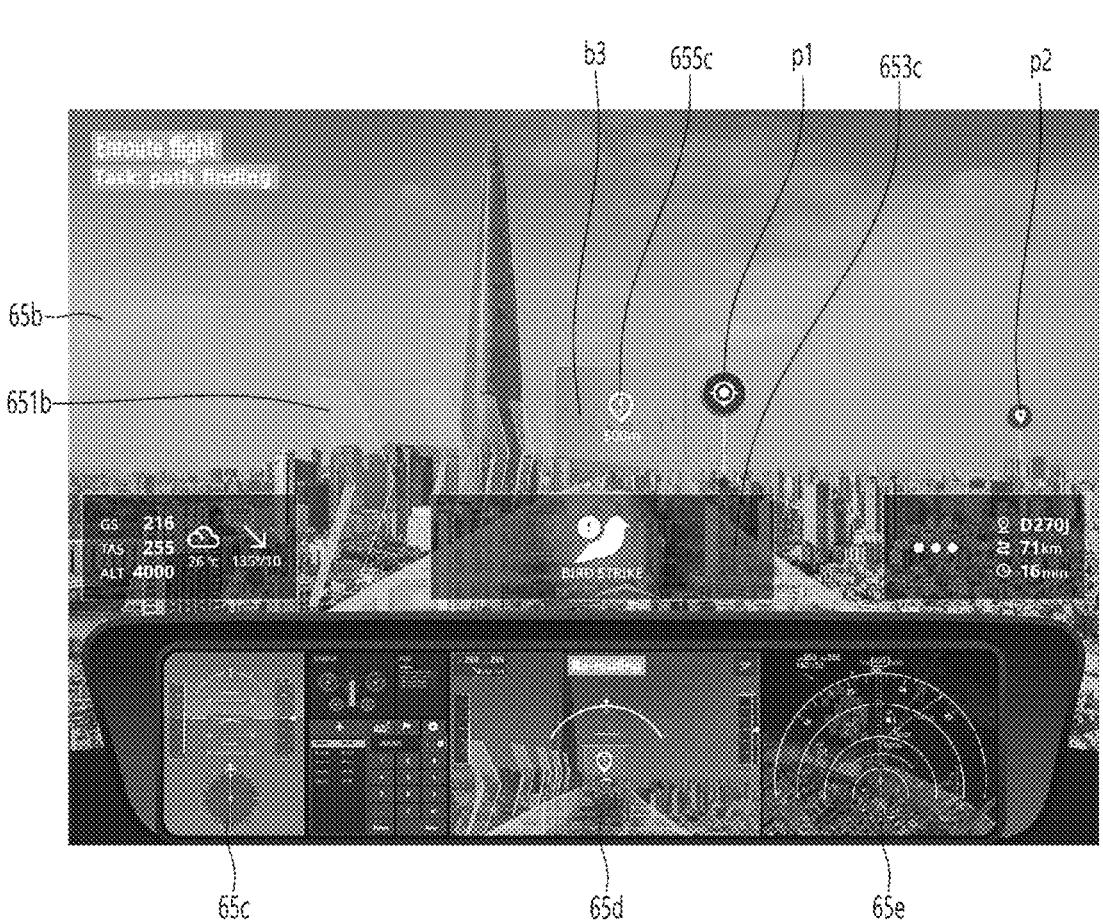

FIGS. 20 and 21 illustrate exemplary screen display methods for screen display and new route generation when the bird flock exists on a flight route as a type of event and there is a risk of bird strike. When a bird flock b3 on a flight route is detected as a dangerous object, it is shown that a UAM flight-related event guidance object 653*c* displaying an icon corresponding to the bird flock b3 detected as a dangerous object is displayed. In this case, the primary flight display 65*b* may display distance information to the bird flock b3, which is a dangerous object, and the number/size of populations and crowds of the bird flock b3, or the like (655*c*). In addition, as the obstacle b3 is detected in the current flight route of the UAM, a flight caution event occurs, and therefore, the primary flight display 65*b* may change and display the color of the area 655*c* where the dangerous object that generates the event is located. In addition, as illustrated in FIG. 20, the primary flight display 65*b* may display the route guidance object 651*b* in different colors to intuitively deliver dangerous information to a pilot.

Meanwhile, the route guidance object 651*b* illustrated in FIGS. 18 to 21 may be divided into a plurality of stages (warning stage, caution stage) according to the possibility of collision between the UAM and the dangerous object, the approach distance, the approach angle, etc., and may be displayed in different colors depending on the divided stage.

According to various embodiments of the present disclosure, it is possible to provide threat factor detection/marking/avoidance functions required in the era of autonomous flight such as UAM and PAV.

In addition, according to various embodiments of the present disclosure, it is possible to provide a threat factor marking system required for manned/unmanned UAM operation.

Meanwhile, the methods according to various exemplary embodiments of the present disclosure described above may be implemented as programs and be provided to servers or devices. Therefore, the respective apparatuses may access the servers or the devices in which the programs are stored to download the programs.

In addition, the methods according to various exemplary embodiments of the present disclosure described above may be implemented as programs and be provided in a state in which it is stored in various non-transitory computer-readable media. The non-transitory computer-readable medium is not a medium that stores data therein for a while, such as a register, a cache, a memory, or the like, but means a medium that semi-permanently stores data therein and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

According to the present disclosure, it is possible to provide threat factor detection/marking/avoidance functions required in the era of autonomous flight such as UAM and PAV.

In addition, according to an embodiment of the present disclosure, it is possible to provide a threat factor marking system required for manned/unmanned UAM operation.

The effects of the present disclosure are not limited to the above-mentioned effects, and other effects that are not mentioned may be obviously understood by those skilled in the art from the following description.

Although various embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, the scope of the present disclosure is not construed as being limited to the described embodiments but is defined by the appended claims as well as equivalents thereto.

What is claimed is:

1. A method of detecting a dangerous object for an aerial vehicle, comprising:
  setting an object detection area in air in which the aerial vehicle is in flight using a first sensor, a second sensor, and a third sensor, wherein the object detection area includes a first area formed by the first sensor, a second area formed by the second sensor within the first area, and a third area formed by the third sensor within the second area;
  detecting an object in the set object detection area;
  acquiring first sensing data, second sensing data, and third sensing data detected by each of the first sensor, the second sensor, and the third sensor;
  generating detailed object information on the detected object by adaptively fusing the acquired sensing data based on a location of the detected object within the object detection area,
  wherein when the detected object is located between an outer boundary of the first area and an outer boundary of the second area, the detailed object information is generated using only the first sensing data,
  wherein when the detected object is located between the outer boundary of the second area and an outer boundary of the third area, the detailed object information is generated by fusing the first sensing data and the second sensing data, and
  wherein when the detected object is located within the third area, the detailed object information is generated by fusing the first sensing data, the second sensing data, and the third sensing data;
  determining whether the detected object is the dangerous object based on the generated detailed object information; and
  controlling a flight operation of the aerial vehicle based on the generated detailed object information.

2. The method of claim 1, wherein the first sensor is a radar sensor, the second sensor is a Lidar sensor, and third sensor is a camera sensor.

3. The method of claim 2, wherein the first sensing data includes 2-dimensional (2D) point cloud data, the second sensing data includes 3-dimensional (3D) point cloud data, and the third sensing data includes an image.

4. The method of claim 3, wherein the generating the detailed object information on the object located between the outer boundary of the first area and the outer boundary of the second area includes generating a first voxel map using the 2D point cloud data included in the first sensing data.

5. The method of claim 3, wherein the generating the detailed object information on the object located between the outer boundary of the second area and the outer boundary of the third area includes generating a first voxel map using the 2D point cloud data included in the first sensing data, generating a second voxel map using the 3D point cloud data included in the second sensing data, and generating a depth map by fusing the first voxel map and the second voxel map.

6. The method of claim 3, wherein the generating the detailed object information on the object located within the third area includes generating a first voxel map using the 2D point cloud data included in the first sensing data, generating a second voxel map using the 3D point cloud data included in the second sensing data, generating a depth map by fusing the first voxel map and the second voxel map, analyzing the image included in the third sensing data to generate an object detection image including a bounding box indicating an area of the object in the image and information on a type of the object corresponding to the bounding box, and generating a final voxel map by fusing the depth map and the object detection image.

7. The method of claim 1, wherein the detailed object information includes at least one of coordinate position, kinematic information, geometric information, and semantic information of the object.

8. The method of claim 7, wherein the detailed object information further includes at least one of a type of the object calculated based on at least one of the coordinate position, kinematic information, geometric information, and semantic information of the object, a flight direction of the object, a flight speed of the object, a distance between the object and the aerial vehicle, and a time to collision between the object and the aerial vehicle.

9. The method of claim 1, further comprising, when the object is determined to be the dangerous object, generating and outputting guidance data for the dangerous object.

10. The method of claim 1, wherein the controlling the flight operation includes, when the object is determined to be the dangerous object, generating control data for the aerial vehicle to avoid the dangerous object.

11. An apparatus for detecting a dangerous object for an aerial vehicle, comprising:
  an object detection area setting unit configured to set an object detection area in air in which the aerial vehicle is in flight using a first sensor, a second sensor, and a third sensor, wherein the object detection area includes a first area formed by the first sensor, a second area formed by the second sensor within the first area, and a third area formed by the third sensor within the second area;
  a sensing data acquisition unit configured to acquire first sensing data, second sensing data, and third sensing data detected by each of the first sensor, the second sensor, and the third sensor;
  an object processing unit configured to detect an object in the set object detection area and generate detailed object information on the detected object by adaptively fusing the acquired sensing data based on a location of the detected object within the object detection area, wherein when the detected object is located between an outer boundary of the first area and an outer boundary of the second area, the object processing unit generates the detailed object information using only the first sensing data, wherein when the detected object is located between the outer boundary of the second area and an outer boundary of the third area, the object processing unit generates the detailed object information by fusing the first sensing data and the second sensing data, and wherein when the detected object is located within the third area, the object processing unit generates the detailed object information by fusing the first sensing data, the second sensing data, and the third sensing data;

a dangerous object determination unit configured to determine whether the detected object is the dangerous object based on the generated detailed object information; and a flight control unit configured to control a flight operation of the aerial vehicle based on the generated detailed object information.

12. The apparatus of claim 11, wherein the first sensor is a radar sensor, the second sensor is a Lidar sensor, and the third sensor is a camera sensor.

13. The apparatus of claim 12, wherein the first sensing data includes 2-dimensional (2D) point cloud data, the second sensing data includes 3-dimensional (3D) point cloud data, and the third sensing data includes an image.

14. The apparatus of claim 12, wherein the object processing unit generating the detailed object information on the object located between the outer boundary of the first area and the outer boundary of the second area generates a first voxel map using the 2D point cloud data included in the first sensing data.

15. The apparatus of claim 12, wherein the object processing unit generating the detailed object information on the object located between the outer boundary of the second area and the outer boundary of the third area generates a first voxel map using the 2D point cloud data included in the first sensor data, generates a second voxel map using the 3D point cloud data included in the second sensing data, and generates a depth map by fusing the first voxel map and the second voxel map.

16. The apparatus of claim 11, further comprising:

when the object is determined to be the dangerous object, an output data generation unit configured to generate output data for guidance on the dangerous object.

17. The apparatus of claim 11, wherein the flight control unit is further configured to, when the object is determined to be the dangerous object, generate control data for controlling the flight of the aerial vehicle to avoid the dangerous object.

18. A non-transitory computer-readable recording medium in which a program for executing a method of detecting a dangerous object for an aerial vehicle, the method comprising:

setting an object detection area in air in which the aerial vehicle is in flight using a first sensor, a second sensor, and a third sensor, wherein the object detection area includes a first area formed by the first sensor, a second area formed by the second sensor within the first area, and a third area formed by the third sensor within the second area;

detecting an object in the set object detection area;

acquiring first sensing data, second sensing data, and third sensing data detected by each of the first sensor, the second sensor, and the third sensor;

generating detailed object information on the detected object by adaptively fusing the acquired sensing data based on a location of the detected object within the object detection area, wherein when the detected object is located between an outer boundary of the first area and an outer boundary of the second area, the detailed object information is generated using only the first sensing data, wherein when the detected object is located between the outer boundary of the second area and an outer boundary of the third area, the detailed object information is generated by fusing the first sensing data and the second sensing data, and wherein when the detected object is located within the third area, the detailed object information is generated by fusing the first sensing data, the second sensing data, and the third sensing data;

determining whether the detected object is the dangerous object based on the generated detailed object information; and controlling a flight operation of the aerial vehicle based on the generated detailed object information.

19. The apparatus of claim 12, wherein the object processing unit generating the detailed object information on the object located within the third area generates a first voxel map using the 2D point cloud data included in the first sensing data, generates a second voxel map using the 3D point cloud data included in the second sensing data, generates a depth map by fusing the first voxel map and the second voxel map, analyzes the image included in the third sensing data to generate an object detection image including a bounding box indicating an area of the object in the image and information on a type of the object corresponding to the bounding box, and generates a final voxel map by fusing the depth map and the object detection image.

* * * * *